(12) United States Patent
Garringer et al.

(10) Patent No.: US 12,122,488 B2
(45) Date of Patent: Oct. 22, 2024

(54) LIVEWELL FOR FISHING BOATS

(71) Applicant: Advanced Marine Performance, LLC, Flippin, AR (US)

(72) Inventors: Bradley G. Garringer, Mountain Home, AR (US); Randy W. Hopper, Flippin, AR (US)

(73) Assignee: Advanced Marine Performance, LLC, Flippin, AR (US)

( * ) Notice: Subject to any disclaimer, the term of this patent is extended or adjusted under 35 U.S.C. 154(b) by 0 days.

(21) Appl. No.: 18/648,901

(22) Filed: Apr. 29, 2024

(65) Prior Publication Data
US 2024/0270353 A1 Aug. 15, 2024

Related U.S. Application Data

(63) Continuation of application No. 17/193,468, filed on Mar. 5, 2021, now Pat. No. 11,970,248.

(60) Provisional application No. 62/989,195, filed on Mar. 13, 2020.

(51) Int. Cl.
| | |
|---|---|
| *B63B 35/26* | (2006.01) |
| *A01K 97/20* | (2006.01) |
| *B63B 1/04* | (2006.01) |
| *B63B 79/10* | (2020.01) |
| *B63B 79/40* | (2020.01) |

(52) U.S. Cl.
CPC ............. *B63B 35/26* (2013.01); *A01K 97/20* (2013.01); *B63B 1/04* (2013.01); *B63B 79/10* (2020.01); *B63B 79/40* (2020.01)

(58) Field of Classification Search
CPC .......... B63B 35/26; B63B 1/04; B63B 79/10; B63B 79/40; A01K 97/20
See application file for complete search history.

(56) References Cited

U.S. PATENT DOCUMENTS

| | | | |
|---|---|---|---|
| 4,748,765 A | 6/1988 | Martin | |
| 4,970,982 A * | 11/1990 | Martin | B63B 35/14 |
| | | | 43/56 |
| 5,822,916 A * | 10/1998 | Power | A01K 97/05 |
| | | | 43/57 |
| 10,990,622 B2 * | 4/2021 | Laster | A01K 97/00 |
| 11,970,248 B2 | 4/2024 | Garringer et al. | |
| 2007/0068063 A1 | 3/2007 | Simpson | |
| 2021/0284293 A1 | 9/2021 | Garringer et al. | |

* cited by examiner

*Primary Examiner* — Anthony D Wiest
(74) *Attorney, Agent, or Firm* — Fish & Richardson P.C.

(57) ABSTRACT

Some fishing boats include a livewell system. This document describes livewell systems that have multiple modes of operation. The modes of operation include, at least, a first mode with a lower water level and a second mode with a higher water level. While the livewell is operating in the second mode, the tank is nearly full of water. Accordingly, with a nearly full tank, the water in the livewell will resist sloshing around while the boat is navigating rough seas or travelling at high speeds or for long distances. Moreover, the health of the fish in the livewell will be protected because of the water's lessened tendency to slosh around in the livewell.

15 Claims, 16 Drawing Sheets

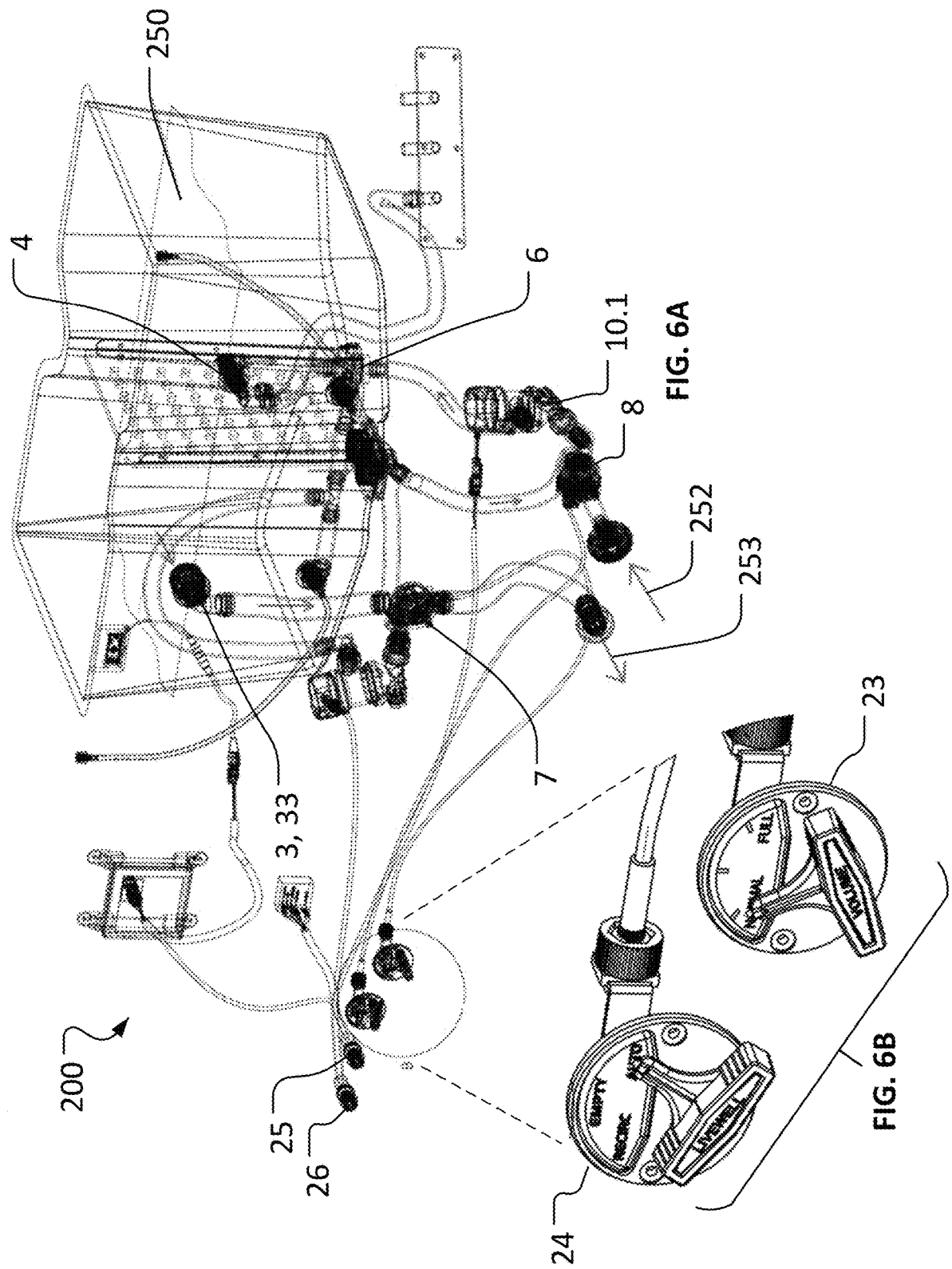

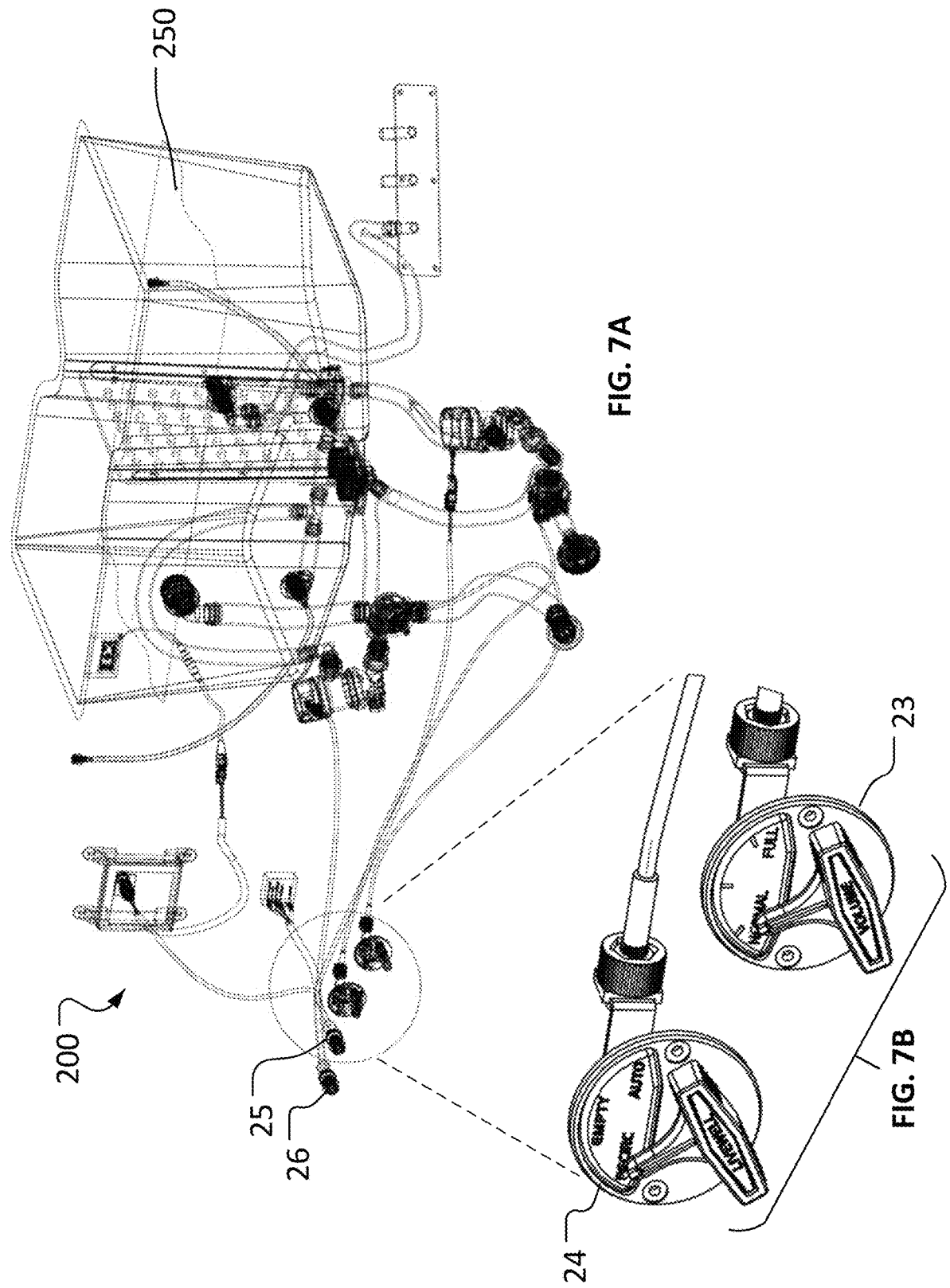

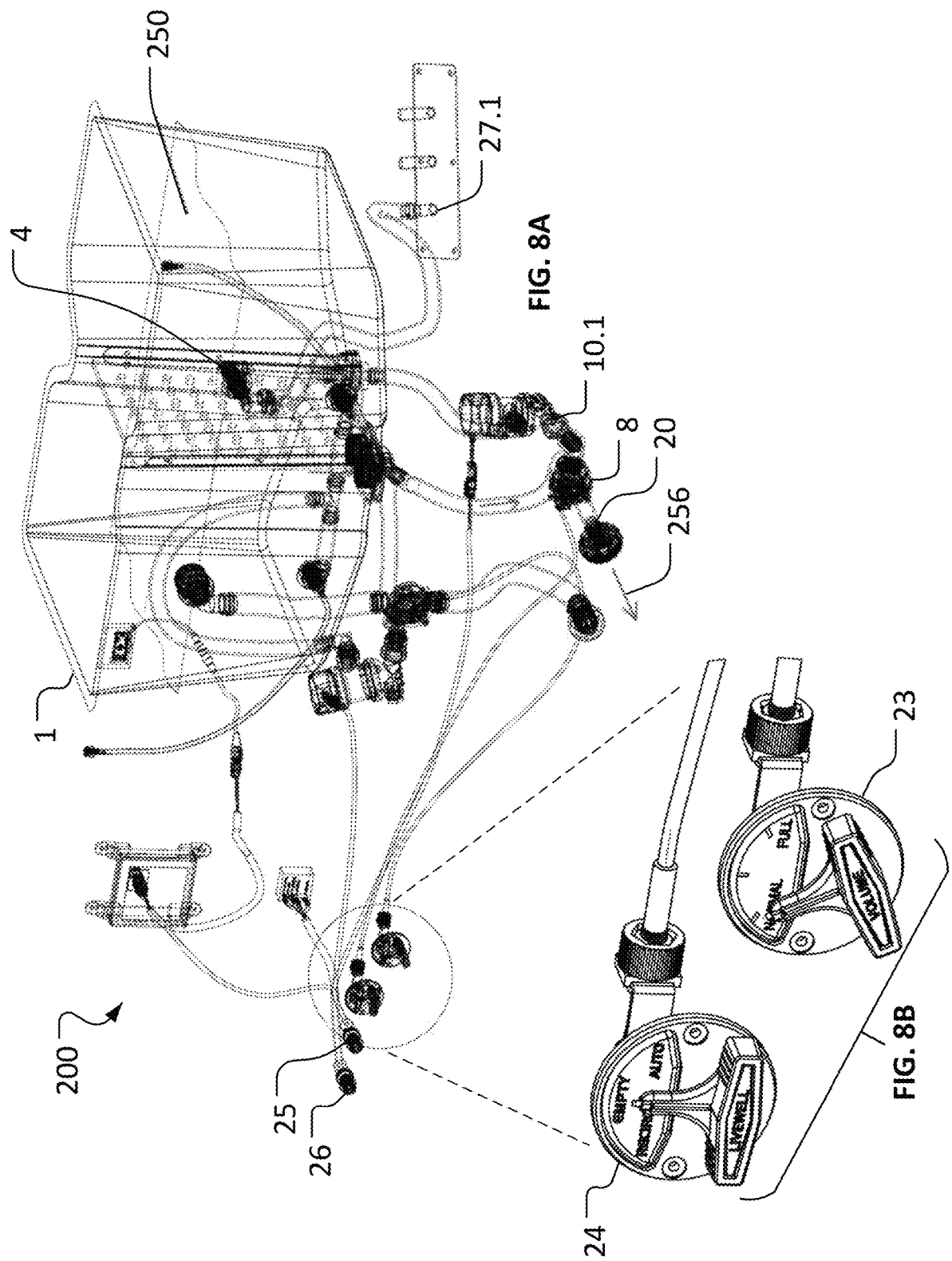

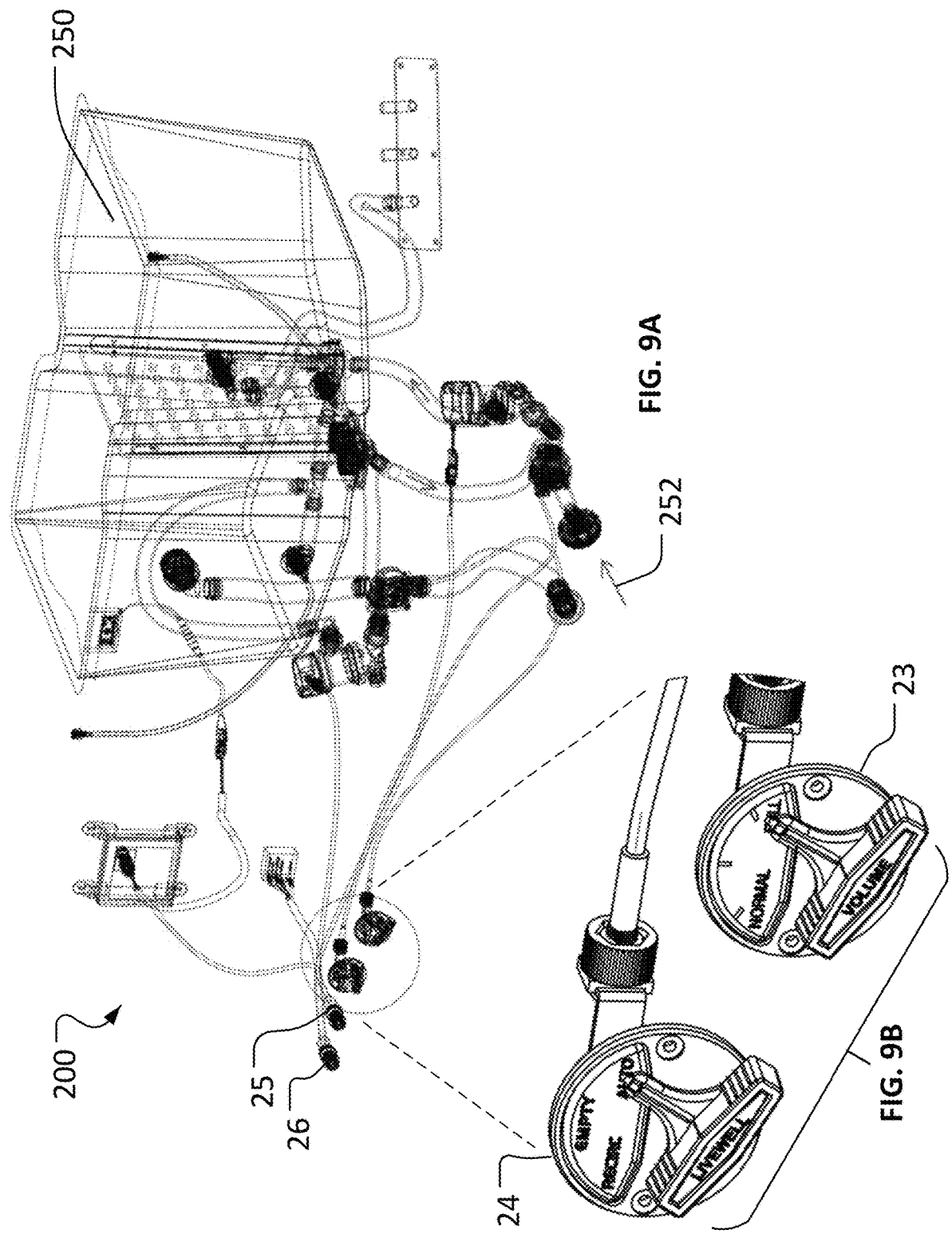

LIVEWELL FOR FISHING BOATS

CROSS-REFERENCE TO RELATED APPLICATIONS

This application is a continuation of U.S. application Ser. No. 17/193,468 (U.S. Pat. No. 11,970,248) filed on Mar. 5, 2021, which claims the benefit of U.S. Provisional Application Ser. No. 62/989,195 filed Mar. 13, 2020. The disclosure of the prior applications are considered part of (and are incorporated by reference in) the disclosure of this application.

BACKGROUND

1. Technical Field

This document relates to boats and livewell systems. For example, this document relates to livewell systems that have multiple modes of operation for use in conjunction with fishing boats.

2. Background Information

Fishermen, or anglers, particularly in fishing tournaments, face the problem of getting to a favorite fishing location as quickly as possible in a power boat, catching as many fish as possible within a limited time period, and returning to the point of departure for a tournament weigh-in before a specified time deadline. This oftentimes involves traveling at high speeds in their powerboat, with the caught fish still alive. In a fishing tournament, score deductions are assessed if the caught fish are dead at the time of their weigh-in. The use of livewells in fishing boats in order to keep caught fish alive is common.

The problem of preserving the health of caught fish in the livewells is particularly acute when navigating at high speeds, in rough seas or over long distances. That is the case because livewells are conventionally used while only partially full of water (e.g., about 75% full or less). Accordingly, the water in a partially full livewell will slosh around within the livewell during the rough ride of the boat. This sloshing, or turbulence of the water, becomes increasingly worse during high-speed boat travel. In addition to a rough and/or high-speed boat ride, the ride may be long. It is not unusual to be traveling long distances, sometimes 50 miles, in rough water. The fish in a partially full livewell, in turn, will be jostled and roughly treated as the water in the livewell sloshes around.

There is also a tendency for water in a partially full livewell to overflow from the livewell and leak out over the course of the boat ride. This can be a problem for fishermen because when water level gets too low, the result is that caught fish in the insufficiently full livewell may die. In contrast, adding water to a livewell system adds weight, which reduces performance of the fishing boat. The added weight can be as much as the weight of an additional person (or more) in the fishing boat.

SUMMARY

This document describes fishing boats and livewell systems. For example, this document describes livewell systems that have multiple modes of operation.

The livewell systems described in this specification include the ability to flood (fill to almost complete capacity) a reservoir tank and maintain the flooded volume during the course of a desired period of time (e.g., when navigating at high speeds, over long distances, and/or over rough seas). The livewell systems can also function in a mode that uses less volume of water in the reservoir tank when a near full livewell is not needed or desired. For example, a full or nearly full livewell may not be needed when travelling at slower speeds, over shorter distances, or in calm seas. A full livewell is heavier than a partially full livewell, so a partially full livewell may be sufficient when a reduction of on-board weight is particularly beneficial. The ability to switch between a partially full livewell and a full livewell is a particular advantage of the livewell systems described in this specification.

An overflow valve can function in an open configuration to allow water to discharge from the livewell to maintain a partially full water level in the reservoir tank in a first mode. The overflow valve can function in a closed configuration to prevent water from discharging from the reservoir tank in a second mode, therefore allowing a water level of the livewell to increase. As described further below, a one-way valve prevents water from back-flowing through the livewell and therefore being discharged from the livewell. Also described further below, a water level sensor and a fluid level control unit electrically communicate with a water supply pump to allow the livewell to maintain either the partial level or the full water level.

The livewell systems described in this specification can be used with any type of boat including powered (motorized) boats and unpowered boats, such as canoes.

The livewell systems described in this specification include the ability to use an optional divider within the livewell reservoir to segregate fish within the livewell. The divider may be slidably attached or pivotably attached to the livewell for ease of use by fishermen. In some cases, an inflatable member is used to control the water level in the livewell.

The livewell systems described in this specification can include a dual circulation capability, using two independent pumps for recirculation of the water in the livewell.

In one aspect, this disclosure is directed to a boat. Such a boat includes a hull and a livewell system. The livewell system includes a reservoir tank, a water supply pump, an upper reservoir drain port, a drain tube, a first valve, a water level sensor, and a control system. The water supply pump is operable to add water into the reservoir tank. The upper reservoir drain port is arranged to allow drainage of a portion of the water out of the reservoir tank when a level of the water in the reservoir tank is at a first elevation. The drain tube is fluidly coupled to the upper reservoir drain port. The first valve is positioned along the drain tube. The first valve is actuatable between: (i) an open configuration that allows the portion of the water to drain out of the reservoir tank through the first valve and (ii) a closed configuration that blocks the portion of the water from draining out of the reservoir tank through the first valve. The water level sensor is arranged to output a high water signal when a level of the water in the reservoir tank is at a second elevation that is above the first elevation. The control system is arranged to receive the high water signal from the water level sensor and configured to output a signal to restrict further addition of water into the reservoir tank in response to receiving the high water signal.

Such a boat and livewell system may optionally include one or more of the following features. The signal to restrict further addition of water may cause stoppage of the water supply pump. The signal to restrict further addition of water may actuate a valve. The livewell system may also include a first selector switch that is actuatable to cause the livewell system to operate in: (i) a first mode and (ii) a second mode. The first valve is in the open configuration while the livewell system is operating in the first mode. The first valve is in the closed configuration while the livewell system is operating in the second mode. The livewell system may also include a second valve fluidly coupled to: (i) a water access port that extends through the hull, (ii) the water supply pump and (iii) a lower reservoir drain port arranged to allow drainage of the water out of the reservoir tank. The livewell system may also include a second selector switch that is actuatable to adjust the second valve between each of: (i) a first arrangement in which the water access port, the water supply pump, and the lower reservoir drain port are all in fluid communication with each other; (ii) a second arrangement in which the water supply pump and the lower reservoir drain port are in fluid communication with each other while the water access port is not in fluid communication with either of the water supply pump or the lower reservoir drain port; and (iii) a third arrangement in which the water access port and the lower reservoir drain port are in fluid communication with each other while the water supply pump is not in fluid communication with either of the water access port or the lower reservoir drain port. In some embodiments, the livewell system also includes a lid that is reconfigurable between: (i) a closed position in which the lid covers a top opening of the reservoir tank and (ii) an open position in which the top opening of the reservoir tank is not covered by the lid. In some embodiments, while the lid is in the closed position and the water in the reservoir tank is at the second elevation, an airspace that is less than three inches high exists between the water and the lid. In some embodiments, while the lid is in the closed position and the water in the reservoir tank is at the second elevation, an airspace that is less than two inches high exists between the water and the lid. In some embodiments, while the lid is in the closed position and the water in the reservoir tank is at the second elevation, an airspace that is less than one inch high exists between the water and the lid.

In another aspect, this disclosure is directed to a livewell system for use on a boat. Such a livewell system includes a reservoir tank, a water supply pump, an upper reservoir drain port, a drain tube, a first valve, a water level sensor, and a control system. The water supply pump is operable to add water into the reservoir tank. The upper reservoir drain port is arranged to allow drainage of a portion of the water out of the reservoir tank when a level of the water in the reservoir tank is at a first elevation. The drain tube is fluidly coupled to the upper reservoir drain port. The first valve is positioned along the drain tube. The first valve is actuatable between: (i) an open configuration that allows the portion of the water to drain out of the reservoir tank through the first valve and (ii) a closed configuration that blocks the portion of the water from draining out of the reservoir tank through the first valve. The water level sensor is arranged to output a high water signal when a level of the water in the reservoir tank is at a second elevation that is above the first elevation. The control system is arranged to receive the high water signal from the water level sensor and configured to output a signal to restrict further addition of water into the reservoir tank in response to receiving the high water signal.

Such a livewell system may optionally include one or more of the following features. The signal to restrict further addition of water may cause stoppage of the water supply pump. The signal to restrict further addition of water may actuate a valve. The livewell system may also include a first selector switch that is actuatable to cause the livewell system to operate in: (i) a first mode and (ii) a second mode. The first valve is in the open configuration while the livewell system is operating in the first mode. The first valve is in the closed configuration while the livewell system is operating in the second mode. The livewell system may also include a second valve fluidly coupled to: (i) a water access port that extends through the hull, (ii) the water supply pump and (iii) a lower reservoir drain port arranged to allow drainage of the water out of the reservoir tank. The livewell system may also include a second selector switch that is actuatable to adjust the second valve between each of: (i) a first arrangement in which the water access port, the water supply pump, and the lower reservoir drain port are all in fluid communication with each other; (ii) a second arrangement in which the water supply pump and the lower reservoir drain port are in fluid communication with each other while the water access port is not in fluid communication with either of the water supply pump or the lower reservoir drain port; and (iii) a third arrangement in which the water access port and the lower reservoir drain port are in fluid communication with each other while the water supply pump is not in fluid communication with either of the water access port or the lower reservoir drain port. In some embodiments, the livewell system also includes a lid that is reconfigurable between: (i) a closed position in which the lid covers a top opening of the reservoir tank and (ii) an open position in which the top opening of the reservoir tank is not covered by the lid. In some embodiments, while the lid is in the closed position and the water in the reservoir tank is at the second elevation, an airspace that is less than three inches high exists between the water and the lid. In some embodiments, while the lid is in the closed position and the water in the reservoir tank is at the second elevation, an airspace that is less than two inches high exists between the water and the lid. In some embodiments, while the lid is in the closed position and the water in the reservoir tank is at the second elevation, an airspace that is less than one inch high exists between the water and the lid.

Particular embodiments of the subject matter described in this document can be implemented to realize one or more of the following advantages.

The modes of operation of the livewell systems described herein include, at least, a first mode with a lower water level and a second mode with a higher water level. While the livewell is operating in the first mode with the lower water level, the weight on board the boat is lessened. While the livewell is operating in the second mode with the higher water level, the tank is nearly full of water. Accordingly, with a nearly full tank, the water in the livewell will resist sloshing around turbulently while the boat is navigating rough seas, while travelling at high speeds, and/or while traveling over long distances. Accordingly, the health of the fish in the livewell will be protected because of the water's lessened tendency to slosh around turbulently in the livewell while the livewell is operating in the second mode.

Unless otherwise defined, all technical and scientific terms used herein have the same meaning as commonly understood by one of ordinary skill in the art to which this invention pertains. The term "full tank of water" does not necessarily imply a completely full tank of water. For example, some air can still exist in the tank, and the tank would still be considered full of water. In some cases, a tank that is greater than or equal to about 90% water and 10% air can be considered "full of water."

Although methods and materials similar or equivalent to those described herein can be used to practice the invention, suitable methods and materials are described herein. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

FIGS. 6A and 6B illustrate the livewell system of FIGS. 2A and 2B while in a first mode of operation.

FIGS. 7A and 7B illustrate the livewell system of FIGS. 2A and 2B while in a second mode of operation.

FIGS. 8A and 8B illustrate the livewell system of FIGS. 2A and 2B while in a third mode of operation.

FIGS. 9A and 9B illustrate the livewell system of FIGS. 2A and 2B while in a fourth mode of operation.

Like reference numbers represent corresponding parts throughout.

DETAILED DESCRIPTION

This document describes fishing boats and livewell systems. For example, this document describes livewell systems that have multiple modes of operation. The modes of operation include, at least, a first mode with a lower water level and a second mode with a higher water level. While the livewell is operating in the second mode, the tank is nearly full of water. Accordingly, with a nearly full tank, the water in the livewell will resist turbulent sloshing around while the boat is navigating rough seas, travelling at high speeds, and/or travelling over long distances. Moreover, the health of the fish in the livewell will be protected because of the water's lessened tendency to slosh around turbulently in the livewell while the livewell is operating in the second mode.

Figure 1A:
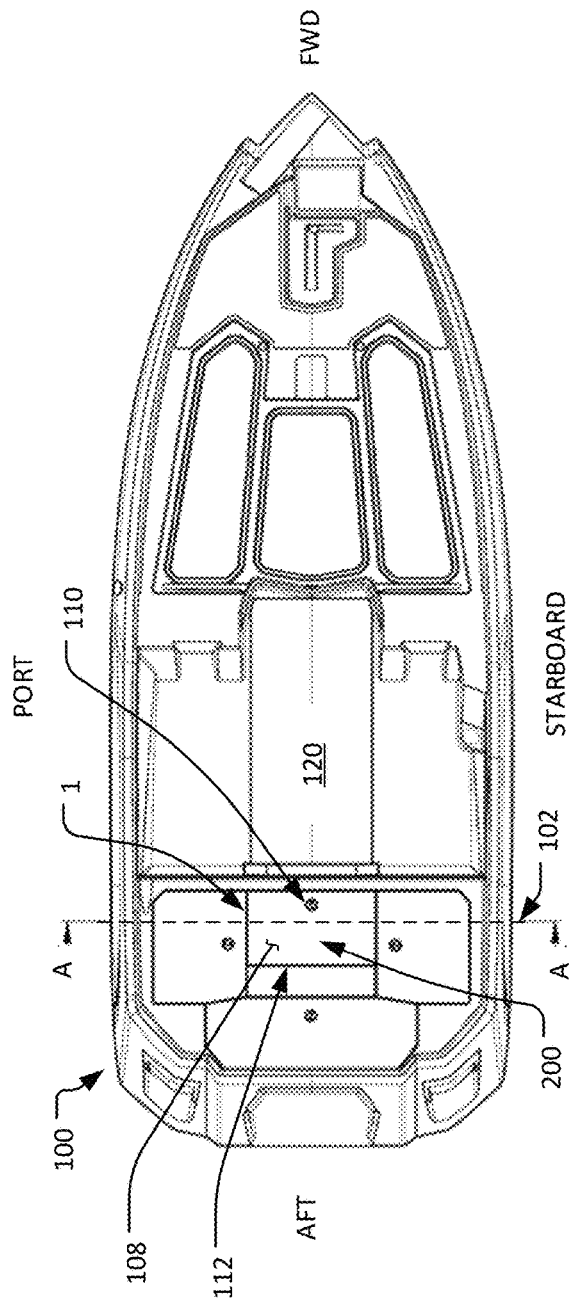
FIGS. 1A-1C illustrate a fishing boat with a livewell system in accordance with some embodiments provided herein.

As shown in FIG. 1A, in some cases a fishing boat 100 can include a livewell system 200. Non-limiting examples of fishing boats include bass fishing boats and deep-V fishing boats. It should be understood that the livewell system 200 described herein can be used in conjunction with any type of watercraft. The livewell system 200 can be integrated into a boat when the boat is manufactured. Alternatively, the livewell system 200 can be sold as an after-market accessory and installed into a boat after the boat has been manufactured.

The livewell system 200 of the fishing boat 100, as depicted, is located aft of a deck 120 of the fishing boat 100, and preferably in an aft or stern section of the fishing boat 100. However, the livewell system 200 can be installed in any area of the fishing boat 100.

The livewell system 200 includes a reservoir tank 1. As depicted, the livewell system 200 can be protected by a deck cover 108 (or fiberglass lid) that is configured to be opened or removed for an angler to gain access the livewell system 200 and the reservoir tank 1. The livewell system 200 can be used during mobile use of the fishing boat 100.

Figure 11:
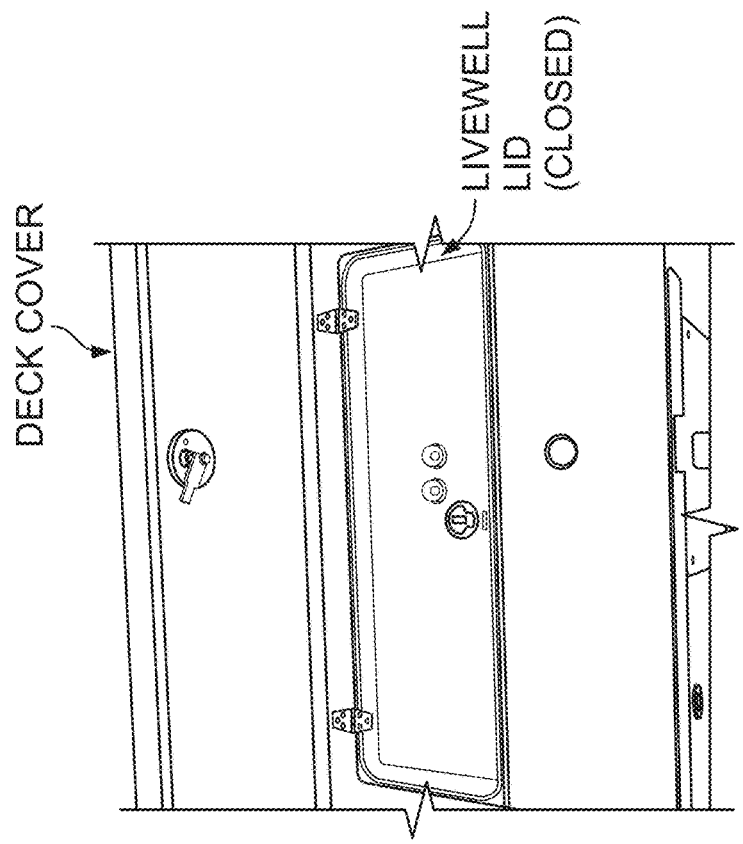
FIG. 11 shows the livewell system of FIG. 10 with the lid closed.
Figure 10:
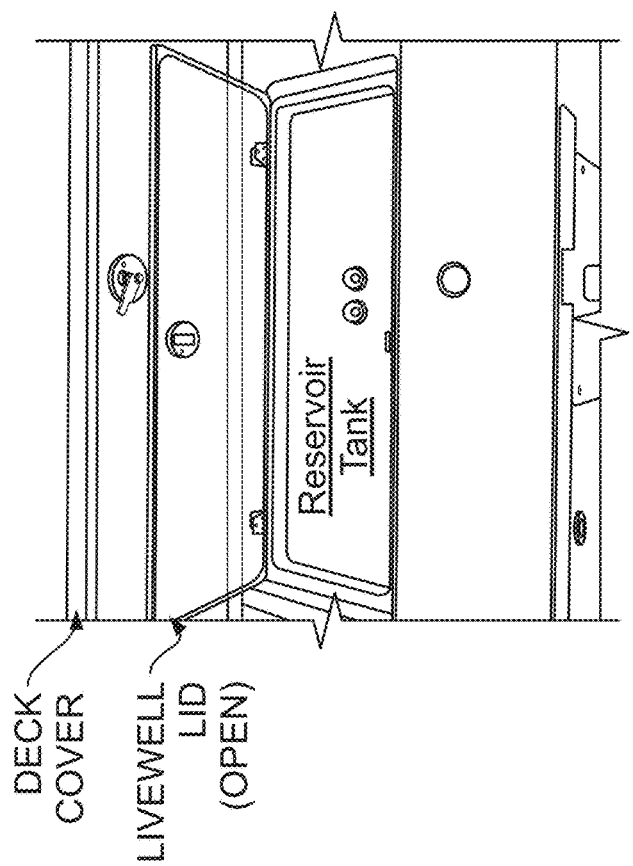
FIG. 10 shows an example livewell system with an open lid.

An additional example of a livewell system incorporated in a fishing boat is shown in FIGS. 10 and 11.

Still referring to FIG. 1A, while one livewell system 200 is used on the fishing boat 100, some fishing boats can include more than one livewell system 200. For example, some fishing boats can have two livewell systems positioned on the fishing boat and some fishing boats can have more than two livewell systems. The intended function of the fishing boat will influence the layout of the livewell system(s) 200. For example, a larger fishing boat for three or more fishermen may conveniently have multiple livewell systems 200.

Figure 1B:
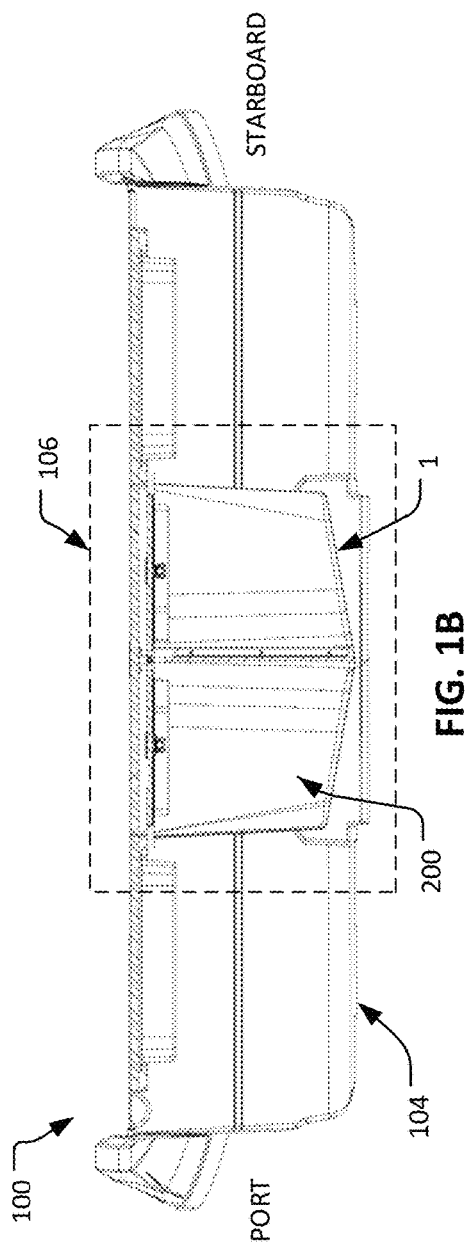

FIG. 1B is a cross-sectional view of the fishing boat 100 along a cut-plane 102 shown in FIG. 1A. The depth of the reservoir tank 1 relative to the fishing boat 100, and in particular, the bottom 104 of the fishing boat 100, is readily apparent from this perspective. Furthermore, the angled bottom profile of the reservoir tank 1 is observable.

Figure 1C:
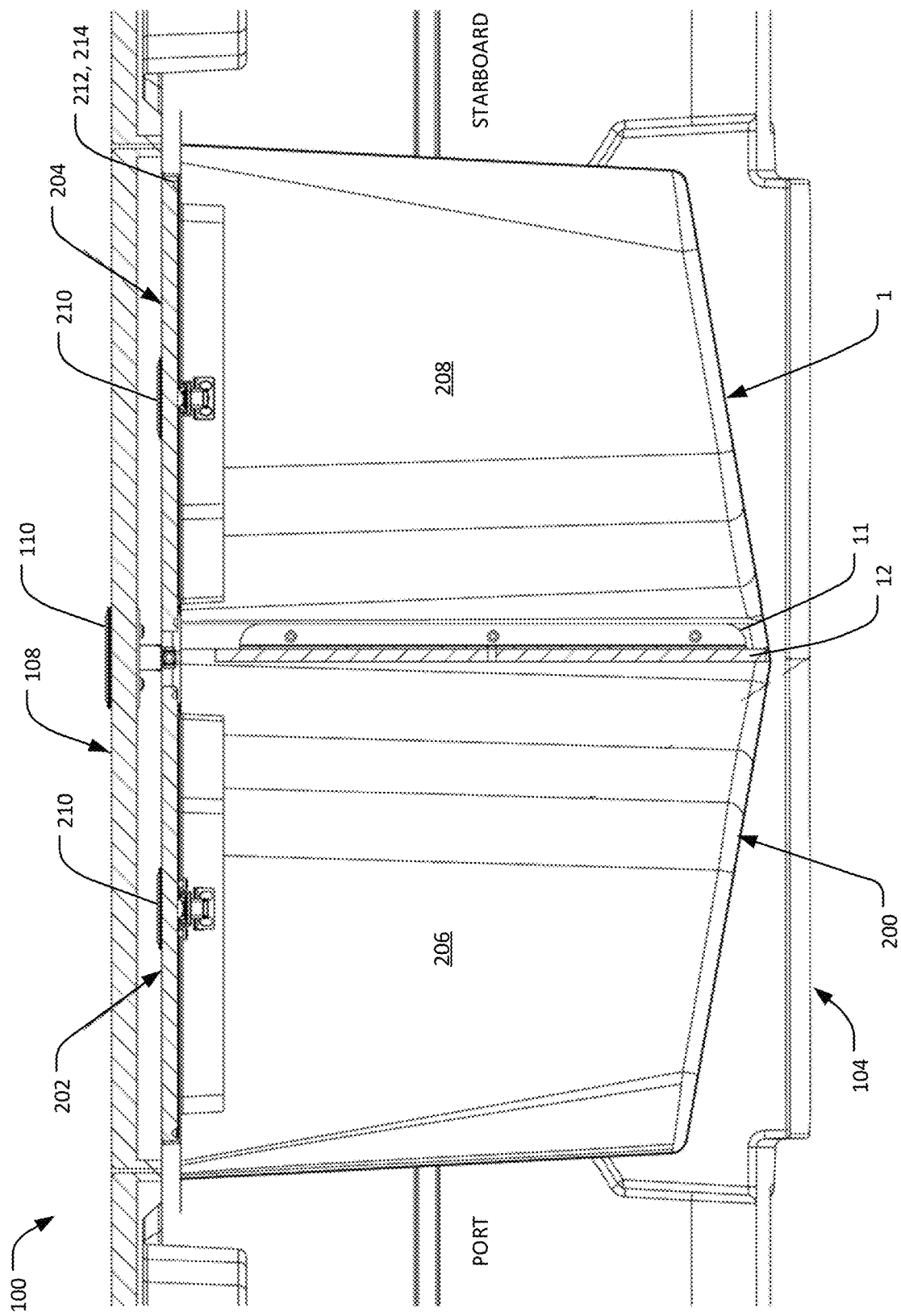

FIG. 1C is a detail 106 (as indicated in FIG. 1B) of the fishing boat 100. The deck cover 108 is pivotably connected to the fishing boat 100 allowing the deck cover 108 to be pivoted upward using a hinged connection (hinged axis 112 as shown in FIG. 1A) to the fishing boat 100. The deck cover 108 includes a latch 110 that is actuatable between a secured position, where the deck cover 108 is secured closed, and an unsecured position, where the deck cover 108 can be pivoted upward allowing a fisherman access to the livewell system 200.

In operation, a fisherman would unlatch the latch 110 of deck cover 108 and lift the deck cover 108 upward causing it to pivot on the hinge, revealing one or more reservoir lids (in this example there are two plexiglass lids 202, 204) of the livewell system 200 underneath. Each of the plexiglass lids 202, 204 are part of the livewell system 200 and are configured to provide an essentially water tight seal of the respective livewell compartments 206, 208 of the livewell system 200. Each plexiglass lid 202, 204 is sealed using gasket 212 that is partially located in a gasket groove 214 that can be defined by the reservoir lids 202, 204 or the compartments 206, 208. By sealing the livewell compartments 206, 208 using the lids 202, 204, any splashing or overflow or water out from the livewell system 200 is reduced or essentially eliminated. Additionally, the plexiglass lids 202, 204 are preferably transparent so a fisherman can view the contents of the livewell system 200 with the plexiglass lids 202, 204 in a closed position.

Each plexiglass lid 202, 204 is individually pivotably connected to the reservoir tank 1 or elsewhere on the fishing boat 100 to allow each plexiglass lid 202, 204 to be pivoted upward using a hinged connection. Each plexiglass lid 202, 204 includes a latch 210 that is manually adjustable to toggle between a secured position, where each plexiglass lid 202, 204 is secured closed and sealed, and an unsecured position, where each plexiglass lid 202, 204 can be pivoted upward allowing a fisherman access to the livewell compartments 206, 208 of the livewell system 200.

In operation, a fisherman would unlatch the latch 210 of one or both plexiglass lids 202, 204 and lift the respective plexiglass lid(s) 202, 204 upward, causing it to pivot on the hinge and reveal an open respective livewell compartment(s) 206, 208 of the livewell system 200 underneath. Accessing the respective livewell compartments 206, 208 allows a fisherman to insert and/or remove fish from the respective compartments 206, 208 of the livewell system 200.

While the deck cover 108 and the plexiglass lids 202, 204 (collectively referred to as "lids") are pivotably hinged to the fishing boat 100, in some livewell systems the lids can be configured to slide out of the way. For example, in some embodiments the lids are configured as one or more sliding doors. In some livewell systems, the lids can be detached from the livewell system and the fishing boat. In some livewell systems, the functionality of the lids are combined into a single lid.

When the plexiglass lids 202, 204 are in the closed position and the reservoir tank 1 is full of water, in some embodiments an airspace, defined by a vertical gap between the plexiglass lids 202, 204 and the water level surface, is less than three inches. In some cases, the airspace is less than two inches high. In some cases, the airspace is less than one inch high. In some cases, no visible airspace gap exists.

While two compartments 206, 208 are shown in the livewell system 200, some livewell systems include a single compartment. Some livewell systems include more than two compartments. For example, three or four compartments may be used with a livewell system while incorporating the innovative aspects of the livewell systems as disclosed herein.

While the deck cover 108 is usually constructed from fiberglass, other materials such as plexiglass, plastic, wood, or metal (e.g., aluminum or stainless steel) can be used. While the plexiglass lids 202, 204 are constructed from plexiglass, other materials such as fiberglass, plastics, or metals (e.g., aluminum or stainless steel) can be used. Preferably, these materials, and any materials described in this specification, would have corrosion resistance properties or coatings (such as anodizing) to reduce the effect of weathering and/or rusting. A person of skill-in-the-art would recognize that many materials could be used for such purposes.

While the deck cover 108 and plexiglass lids 202, 204 are shown in the closed position, the livewell system 200 can be operated with the deck cover 108 and/or plexiglass lids 202, 204 in the open position. For example, when adding fish or removing fish from the livewell system 200.

Figure 2A:
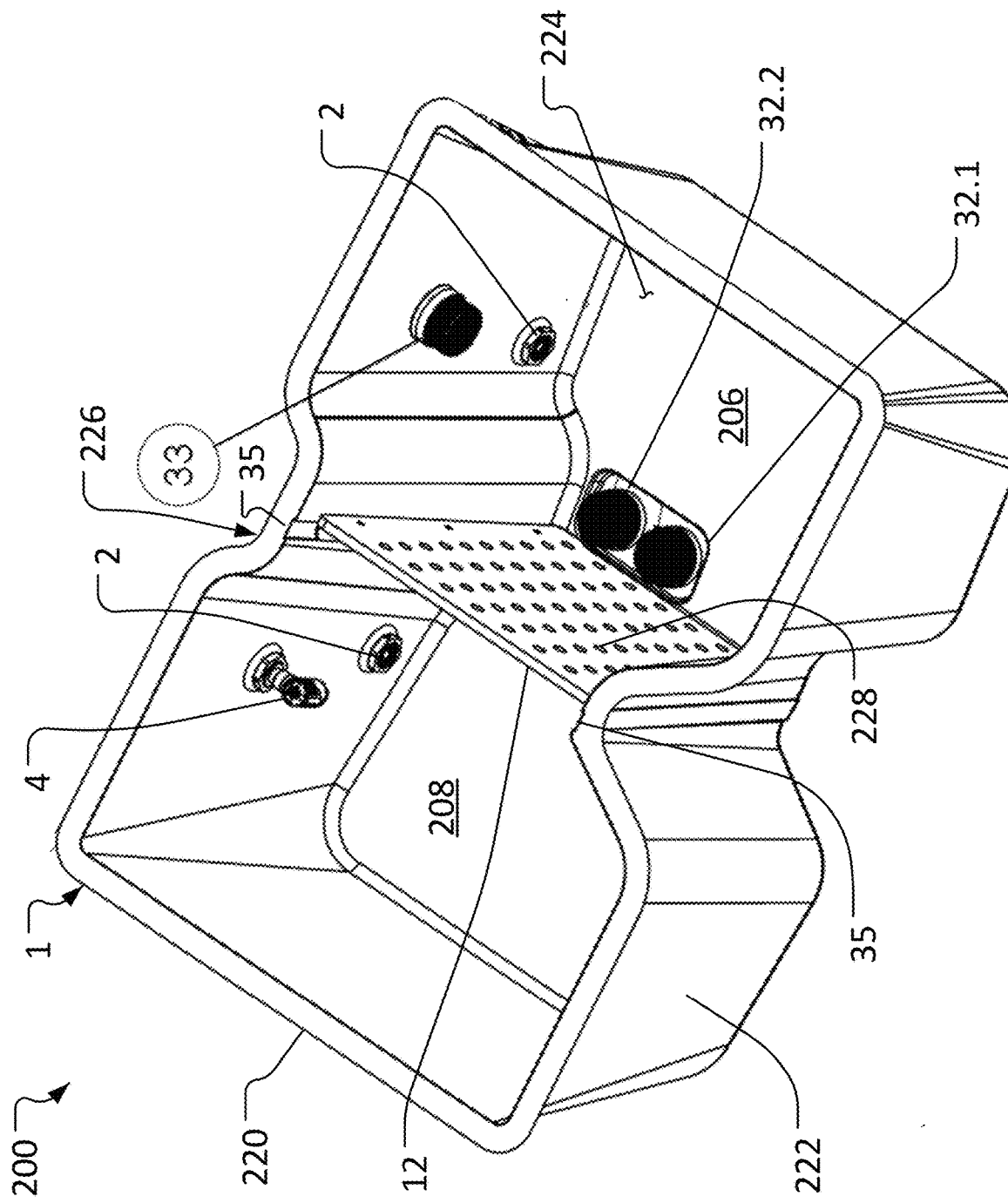
FIGS. 2A and 2B are perspective views of an example livewell system in accordance with some embodiments provided herein.

FIG. 2A is a perspective view of the livewell system 200. The reservoir tank 1 forms the structure of the livewell system 200 and includes sidewalls 222 and a bottom surface 224. The depicted exemplary livewell system 200 also includes an optional tank divider 12. The top surface of the reservoir tank 1 includes a lip 220 that radially extends from the sidewalls 204 and is configured to rest on, and be secured to, a mating surface of the fishing boat 100.

The reservoir tank 1 is configured to hold a volume of water defined by the size and separation of the sidewalls 222, and by the depth of the reservoir tank 1 defined by the bottom surface 224. It should be understood that the livewell system 200 is scalable to any desired size (e.g., in terms of water volume). For example, without limitation, in some example embodiments the reservoir tank 1 can hold about 30 gallons of water in a full configuration and about 23 gallons in a 75% full configuration (i.e., partially full).

The reservoir tank 1 can be constructed out of any suitable material. In some embodiments, the reservoir tank 1 is constructed of fiberglass, however other materials such as plexiglass, plastic, wood, metal (e.g., aluminum, stainless steel, etc.), and combinations of such materials, can be used.

The reservoir tank 1 is sized and shaped to be incorporated within the fishing boat 100. For example, in the depicted example, the reservoir tank 1 includes a mid-section 226 with a decreased width. The reservoir tank 1 can have a symmetrical or asymmetrical profile about the divider 12. The bottom surface 224 can be sloped to be deeper at the location of the divider 12 and shallower far from the divider 12. This can help to allow proper drainage of the livewell system 200.

While the example reservoir tank 1 is sized and shaped as shown in FIG. 2A, some reservoir tanks are skinnier, wider, and/or deeper (while incorporating the innovative aspects of the livewell systems as disclosed herein). The size and shape of the reservoir tank 1 depends on the available design space of a particular fishing boat, but also on the intended purposes of the livewell system 200. In some fishing contexts (e.g., northern pike fishing), fish can be large and require a longer reservoir tank 1 to accommodate the larger fish. For example, muskies are a popular sport fish in northern fishing environments and can grow to be several feet in length. Conversely, in some fishing environments with smaller fish, such as bass, a smaller reservoir tank can be sufficient.

The reservoir tank 1 includes the divider 12 that separates or divides the reservoir tank 1 into a first livewell compartment 206 and a second livewell compartment 208. The divider 12 can be designed to mount to and function with the reservoir tank 1 in various manners. The depicted example divider 12 vertically slides into position in the reservoir tank 1 to divide the livewell compartments 206, 208. Brackets 11 (best shown in FIG. 1C) can be mechanically connected to the divider 12 and slidably engage grooves 35 located in the mid-section 226 of the reservoir tank 1 to secure the divider 12 in place within the reservoir tank 1. The grooves 35 are oriented vertically, and have a groove width greater than a width of the bracket 11 to allow sliding clearance of the bracket 11 within the grooves 35. In some cases, a slight interference fit between the bracket 11 and the grooves 35 is used to secure the divider 12 in place. The divider 12 is constructed from a hard plastic and is nearly rigid to reduce deformation, but other materials can be used.

The divider 12 can include multiple openings 228 that allow water to freely flow (i.e., fluidly communicate) between the two livewell compartments 206, 208. The divider 12 functions to segregate fish located in the first livewell compartment 206 from mixing with fish located in the second livewell compartment 208. Segregating fish is particularly important in a tournament-fishing situation where two or more people in a single fishing boat are competing with each other. In these cases, it is important to segregate the fish for scoring purposes. In some cases, it is important to segregate fish that would otherwise be adversarial towards each other.

As previously mentioned, the size of the reservoir tank 1 depends on the intended fish to be stored within the livewell system 200, and therefore, it is beneficial to allow the divider 12 to be easily removable by a fisherman without tools.

While the divider 12 is shown with an array of circular openings 228, some livewell systems use other types of openings. Some dividers include slot openings or square openings instead of circular openings. Some dividers include mesh-like or screen-like openings. Some dividers have openings that vary in diameter so that smaller diameter openings are used with smaller fish. Some dividers have a circular array or hexagonal array of openings.

While the divider 12 is used with the livewell system 200, some livewell systems do not use a divider. This is preferable for small livewell systems and fishing boats with several livewell systems.

While the divider 12 is slidably engaged with the reservoir tank 1, some livewell systems include a divider that is pivotably hinged to a reservoir tank. In this case, hinges are located on one side of the reservoir tank and the divider can pivot from an open position, where one large compartment exists, to a closed position, where the two compartments 206, 208 become segregated as shown in FIG. 2A.

Some livewell systems include a divider that includes two halves. A first half is pivotably hinged to a reservoir tank on one side, and a second half is pivotably hinged to the reservoir tank on the opposite side of the first half. This allows the divider to open and close like a set of double-doors.

While the divider 12 allows fluid communication between each of the two compartments 206, 208 within the reservoir tank 1, some livewell systems include a divider that does not allow fluid communication between each of the two divided compartments. Such a case is beneficial in larger livewell systems when only a subset of the livewell is needed at a given time (e.g., one fisherman with only small fish). Instead of filling an entire livewell system, only one half of the livewell needs to contain water. This can provide weight and therefore performance benefits to a fishing boat. In this case, the divider can be sealed to prevent fluid communication between the two compartments. In this case, the divider does not contain openings and provides an essentially water-tight seal between the two compartments.

Figure 2B:
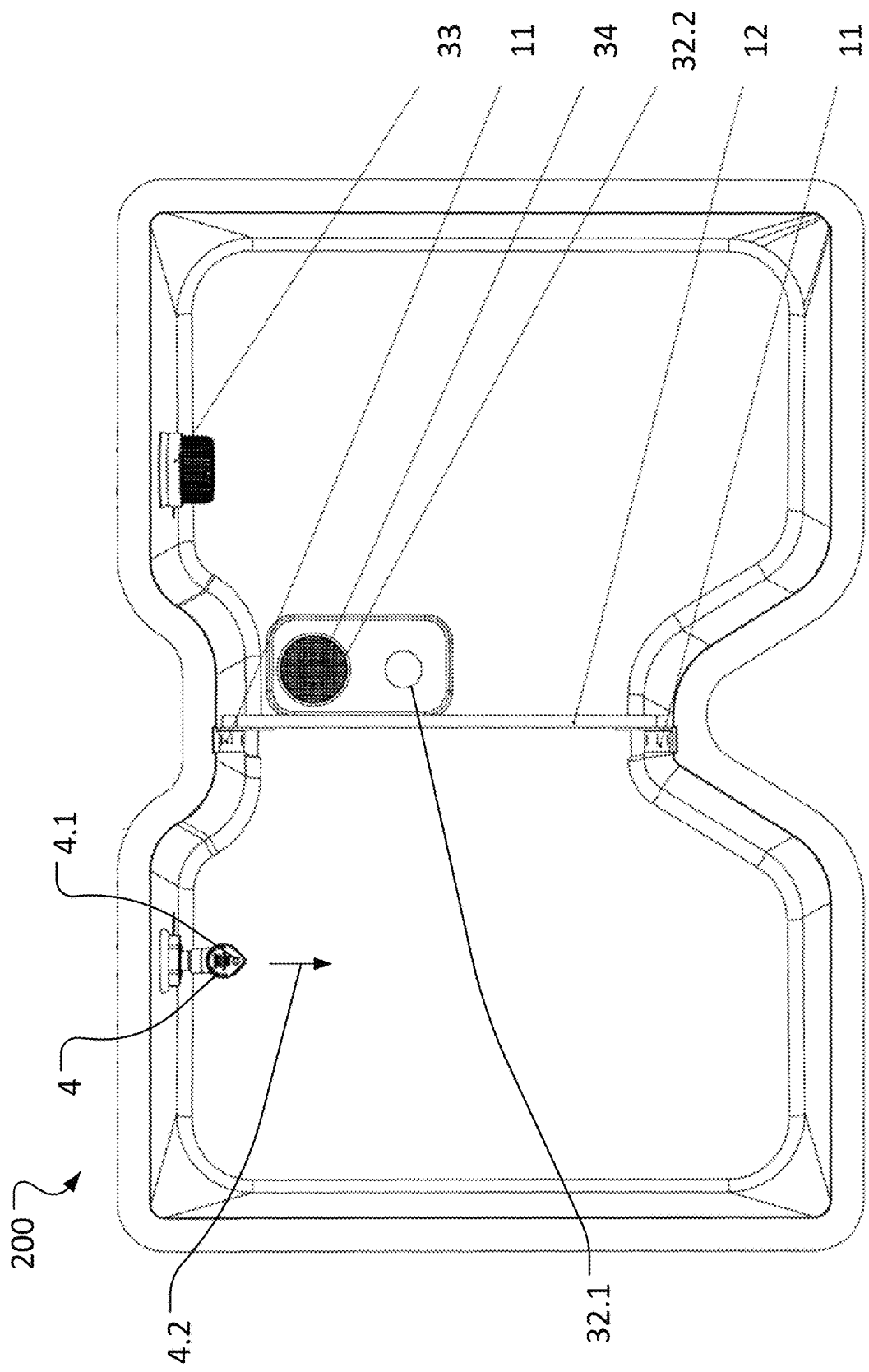
Figure 3A:
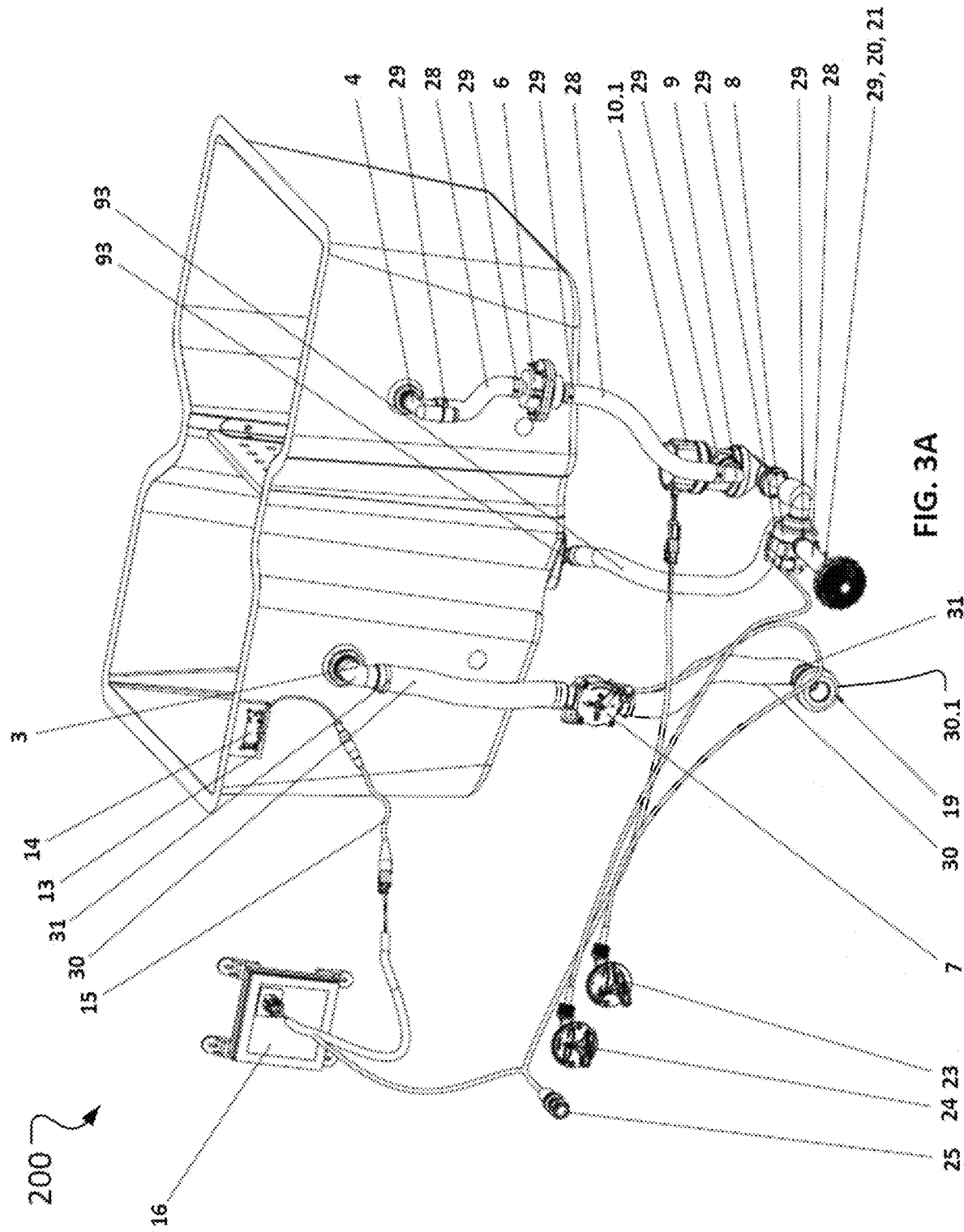
FIGS. 3A and 3B show a first partial assembly of the livewell system of FIGS. 2A and 2B.
Figure 3B:
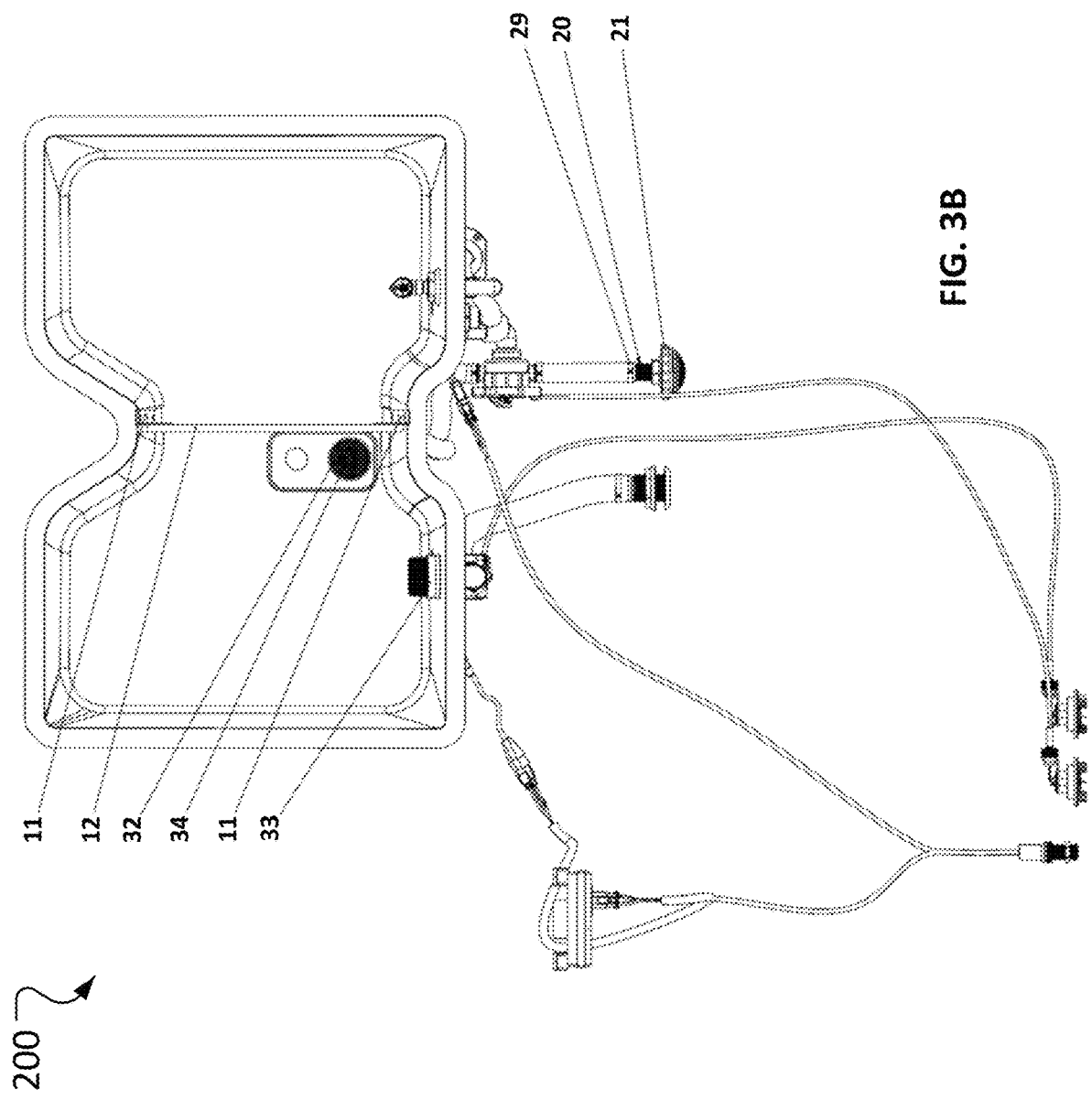

With reference now also to FIGS. 2B, 3A, and 3B, various fluid connection ports of the reservoir tank 1 allow water to be injected into, drained from, and siphoned from, the reservoir tank 1 of the livewell system 200. In general, the fluid connection paths used with the livewell system 200 can be provided by flexible tubing 28 (e.g., ¾" size or any other suitable size) and clamps 29 on each end of the tubing 28 to form a fluid tight connection among the components of the livewell system 200.

Figure 5A:
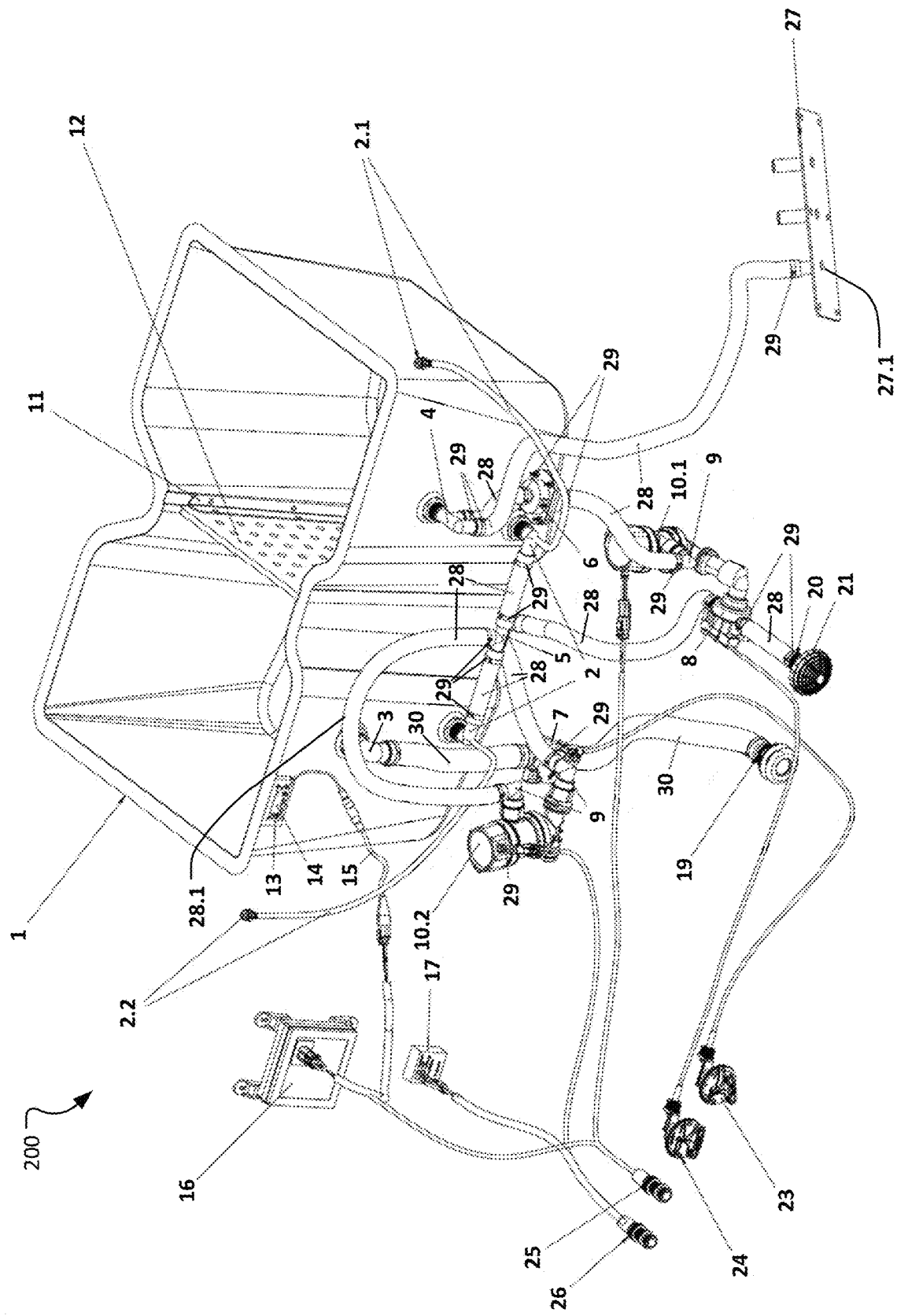
FIGS. 5A and 5B show an assembly of the livewell system of FIGS. 2A and 2B.

A spray head 4 is located on a sidewall 222 of the reservoir tank 1 and is configured to spray water into the reservoir tank 1 through one or more openings. The spray head 4 has two modes of operation. In a first mode, water is sprayed into the reservoir tank 1 to add water to the reservoir tank 1. In a second mode, water is not sprayed into the reservoir tank 1 and is instead redirected to a discharge port 27.1 on a bilge plate 27 mounted on the hull of the fishing boat 100 (the discharge port 27.1 is shown in FIG. 5A).

The spray head 4 is configured to be manually toggled from the first mode into the second mode by manually pulling the spray head 4 in a direction 4.2 towards the interior of the reservoir tank 1 (direction 4.2 is shown in FIG. 2B). Spray head 4 includes a small hole 4.1 to create venturi effect as water exits the spray head 4 into the reservoir tank 1. The small hole 4.1 siphons air into the sprayed water to aerate the water. Aeration allows the fish within the reservoir tank 1 to breathe oxygenated water.

An overflow drain 33 (or upper reservoir drain port) is located on a sidewall 222 opposite the spray head 4 and includes a drain screen (e.g., 1⅛" or other suitable size). The overflow drain 33 is configured for discharging water from the reservoir tank 1 so that the water level does not exceed the vertical elevation of the overflow drain 33. Depending on the setting of the livewell system 200, discharging water may be restricted, by a closed setting of an overflow valve 7, from flowing through the overflow drain 33.

A pair of drains 32.1, 32.2 (collectively "drains" 32) are located on a bottom surface of the reservoir tank 1 and are configured to provide drain water from the reservoir tank 1 for discharge or for recirculation, depending on the operational mode of the livewell system 200. The drains 32.1, 32.2 can include filters or screens to limit debris in the reservoir tank 1 from entering the plumbing of the livewell system 200.

The spray head 4 is fluidly connected to a water supply pump 10.1 that is configured to pump water into reservoir tank 1. In some embodiments, the water supply pump 10.1 is capable of providing about 800 gallons per hour of water flow, but other pump capacities can be used with the livewell system 200.

The water supply pump 10.1 is electrically controlled by a fill switch 25 configured to turn the water supply pump 10.1 on and off. The water supply pump 10.1 is electrically connected to a power source (e.g., a 12 volt battery, not shown) within the fishing boat 100.

The water supply pump 10.1 is fluidly connected to a three-way valve 8 that is controlled by a livewell control knob 24. The livewell control knob 24 is configured to allow a user to select between three modes of operation: "auto," "empty," and "recirculate." When the livewell control knob 24 is in the "auto" position, a three-way valve 8 allows water to be pumped in from outside of the fishing boat 100 (e.g., from a pond or lake), through a thru-hull filter 21 (e.g., ¾" or any other suitable size) and a thru-hull fitting 20 (e.g., ¾" or any other suitable size). Water is allowed to enter the livewell system 200 through the thru-hull fitting 20, through the three-way valve 8, through the water supply pump 10.1, to the spray head 4, and into the reservoir tank 1.

The other modes of operation (i.e., "empty" and "recirculate" modes) will be described later in this specification. During use, the fill switch 25 is toggled into the "on" position. If, at any point of the operation the fill switch 25 is toggled into the "off" position, the water supply pump 10.1 is turned off and the filling process is stopped.

When the livewell control knob 24 is in the "auto" mode, water is pumped into the reservoir tank 1 and the water level increases. The water level eventually reaches the vertical elevation of the spray head 4. If the water level is increased still farther, the small hole 4.1 becomes blocked and aeration from the spray head 4 stops.

When the water level reaches the vertical elevation of an overflow drain 33, water flows into the overflow drain 33, through an overflow fitting 3, through an overflow valve 7, and out of the livewell system 200 through a discharge port 30.1 (of a set of ports 30) that is located in a thru-hull location of the fishing boat 100.

The overflow valve 7 is mechanically connected to a volume control knob 23. The volume control knob 23 is configured to operate as a switch to allow a user to select between at least two modes of operation including "normal" and "full." When the volume control knob 23 is in "normal" mode, the water level in the reservoir tank 1 does not exceed the overflow drain 33, as previously described. Instead, any water above a water level defined by the overflow drain 33 is discharged through the discharge port 30.1.

The overflow valve 7, which is positioned along a drain tube, is manually actuatable using the volume control knob 23 between: (i) an open configuration that allows a portion of the water to drain out of the reservoir tank 1 through the overflow valve 7 and (ii) a closed configuration that blocks the portion of the water from draining out of the reservoir tank through the overflow valve 7. When the volume control knob 23 is in "full" mode, the overflow valve 7 is moved into a closed positon so water cannot be discharged from the livewell system 200. In this case, the water level in the reservoir tank 1 can increase beyond the elevation of the overflow drain 33 and the spray head 4.

To avoid back-flow through the spray head 4 when the water supply pump 10.1 is not running, the back-flow preventer or one-way valve 6 prevents water from flowing through the one-way valve 6 and back through tubing line to the thru-hull connector 21 and out of the livewell system 200. The one-way valve 6 only permits water to flow into the reservoir tank 1, but water cannot leave the reservoir tank 1 through the one-way valve 6, even when the water supply pump 10.1 is off.

As the water level increases above the overflow drain 33, the water level eventually reaches a water level sensor 14. In some embodiments, the water level sensor 14 is a proximity sensor that senses the presence of water through a sidewall of the reservoir tank 1 (e.g., using an ultrasonic sensor). However, many other types water level sensors can be used with the livewell system 200. For example, a float style switch, an optical sensor, and other types of sensors/switches can be used to measure the water level in the reservoir tank 1. In the depicted embodiment, the water level sensor 14 is mounted on a switch plate 13 on a sidewall of the reservoir tank 1.

The vertical elevation and detection sensitivity of the water level sensor 14 define the "full" water level configuration of the tank. For example, in the example implementation shown in FIG. 3A, the vertical elevation of the water level sensor 14 is established such that the water level sensor 14 is triggered when the reservoir tank 1 meets or exceeds about a 90% full level. In some livewell systems, the water level sensor 14 is triggered when the water level reaches about 95% of the capacity of the reservoir tank 1, and in other livewell systems, it is about 85%. A person of skill in the art will recognize that the vertical elevation of the water level sensor 14 can be positioned at any desired elevation along a sidewall of the reservoir tank 1. In some embodiments, the vertical elevation of the water level sensor 14 (e.g., the position of the water level sensor 14 relative to the reservoir tank 1) is adjustable by the user of the livewell system 200.

In some embodiments, the livewell system 200 includes multiple water level sensors 14 positioned at differing elevations on the reservoir tank 1. In some such embodiments, the user can controllably select which water level sensor of the multiple water level sensors 14 is/are operational (thereby selectively controlling the level of water in the reservoir tank 1).

When the water level reaches the water level sensor 14, an electrical control signal is sent from the water level sensor 14 to a fluid level control unit 16. The fluid level control unit 16 includes electrical circuitry or a microprocessor for interpreting the signal of the water level sensor 14 and for controlling the water supply pump 10.1 in response thereto. When the water level sensor 14 signals to the fluid level control unit 16 that the water level has reached the vertical position of the water level sensor 14 (i.e., a high water signal), the fluid level control unit 16 responsively sends a control command to the water supply pump 10.1 to stop fluid flow to restrict the addition of water into the reservoir tank 1. For example, the signal can cause a stoppage of water flow of the water supply pump 10.1 by removing power to the water supply pump 10.1.

In some livewell systems, the fluid level control unit 16 sends a control signal to open the overflow valve 7 to reduce water in the reservoir tank 1.

In some livewell systems, more than one water level sensors 14 are used. For example, a livewell system can have two or three water level sensors so that multiple water levels can be maintained in the reservoir tank 1. Such a configuration would allow a livewell system to have a "low", "halfway", and "full" water level. A person of skill in the art would recognize that a nearly infinite number of water level sensors could be used to provide a nearly continuous range of water level options for a livewell system.

In some livewell systems, more than one water level sensors are used to increase the reliability of the water level measurement. For example, two water levels sensors can be positioned horizontally to one another to provide two independent measurements for the water level. This measurement information is then analyzed by the fluid level control unit 16 to determine the water level.

In some livewell systems, the fluid level control unit 16 alerts a user that the water level has reached a certain elevation. In some cases, the alert is audible using a speaker. In some cases, an LED on the desk of the fishing boat 100 is illuminated to indicate the water level.

At this point additional water no longer flows into the reservoir tank 1 and the filling process is stopped. When the water level decreases from the water level sensor 14 (e.g., from splashing out of the reservoir tank 1), the fluid level control unit 16 sends a control command to the water supply pump 10.1 to resume fluid flow and the filling process continues. To account for sloshing or tilting variability of the water in the reservoir tank 1, the fluid level control unit 16 can be configured to analyze the water level over a predetermined time period. For example, in some cases, water splashing on the sidewall adjacent to the water level sensor 14 can create false alarms. These false alarms are reduced by analyzing the water level over the predetermined time period. For example, the predetermined time period can be two or three seconds. In some cases, the predetermined time period is less than two seconds (e.g., one second) and in other cases, the predetermined time period is greater than three seconds (e.g., ten seconds). This process is repeated until the fill switch 25 is turned off.

Figure 4A:
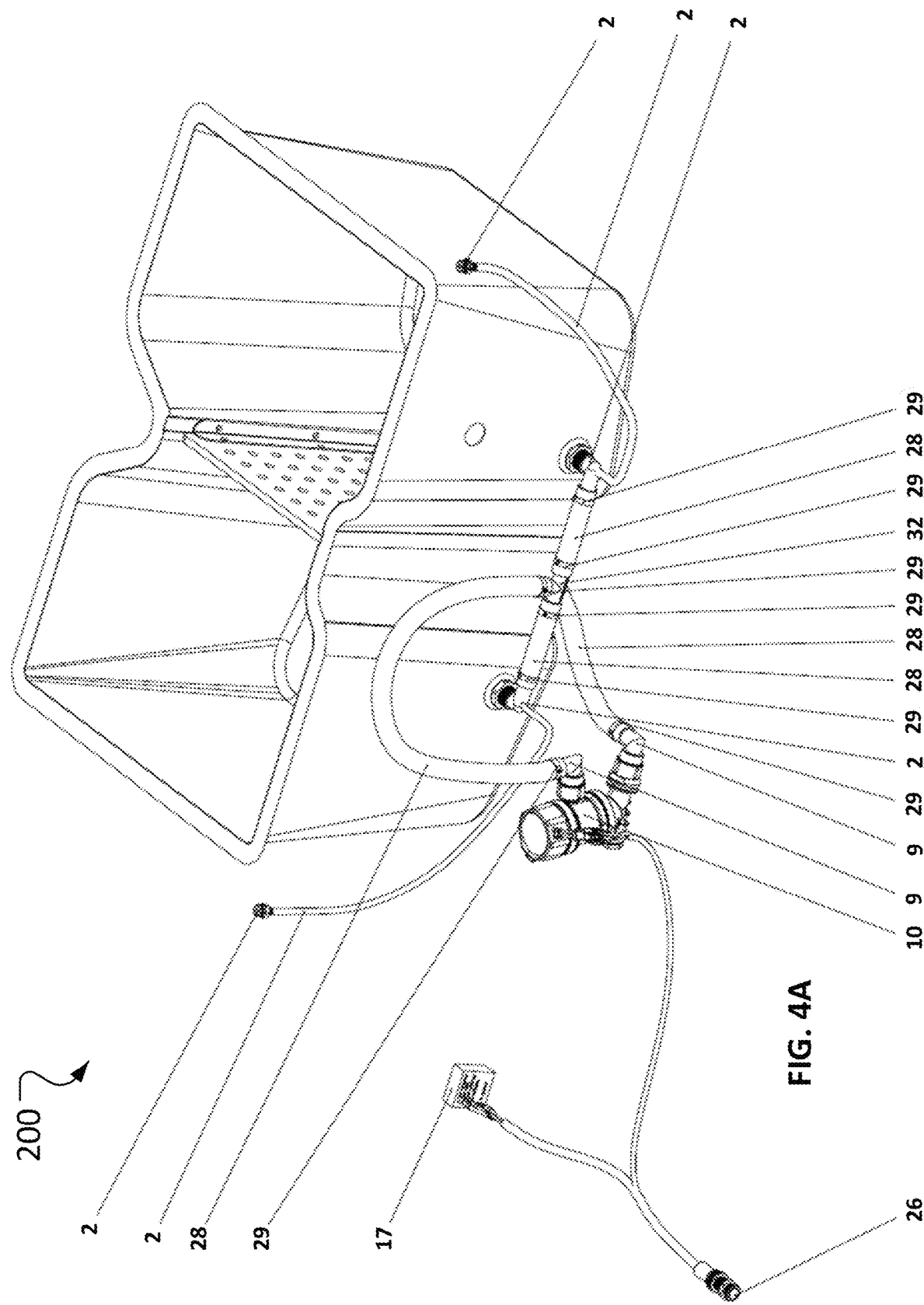
FIGS. 4A and 4B show a second partial assembly of the livewell system of FIGS. 2A and 2B.
Figure 4B:
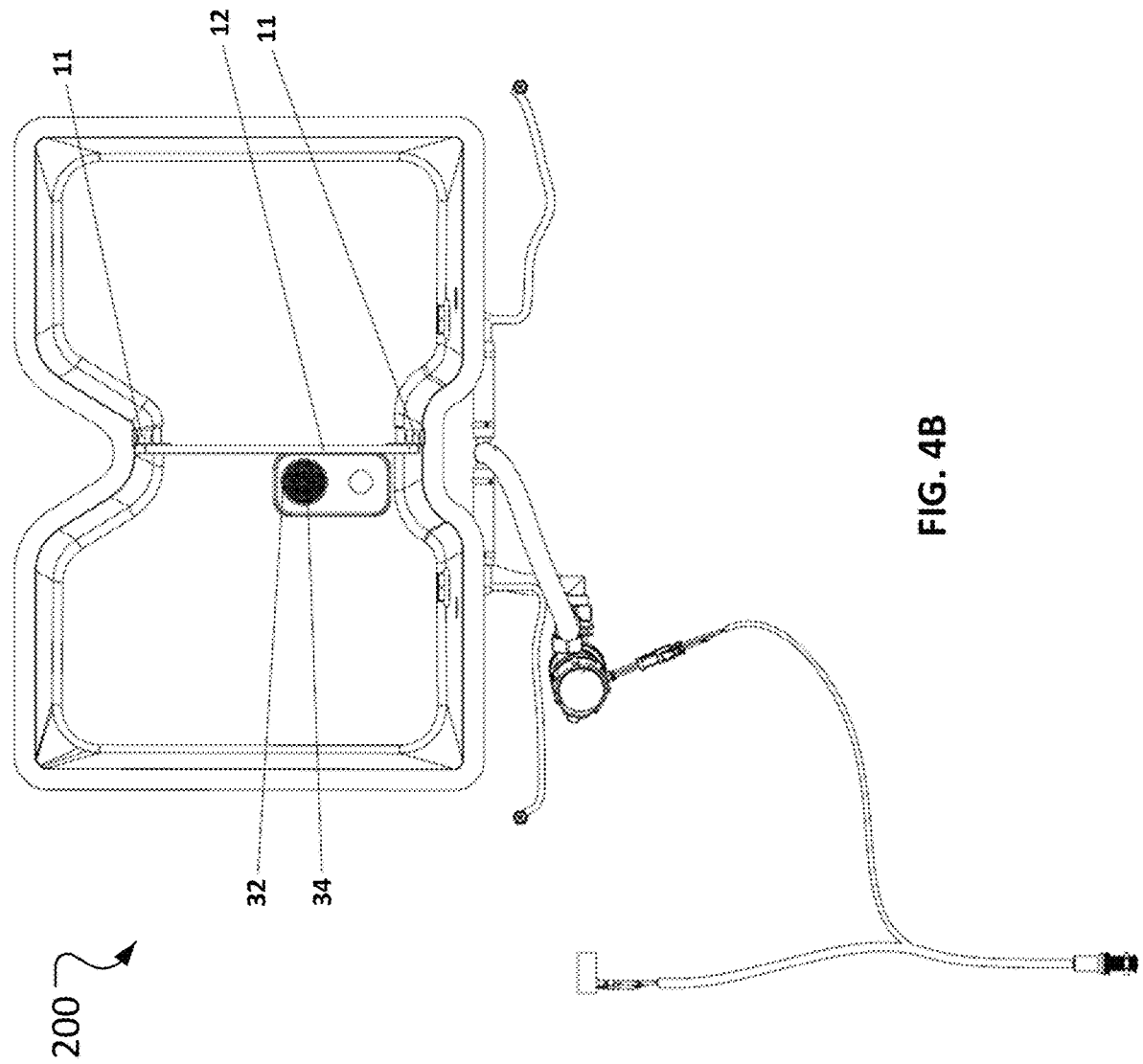

The recirculation functionality of the livewell system 200 will now be described with reference to FIGS. 4A and 4B (in addition to the previously-referred to FIGS.).

Figure 5B:
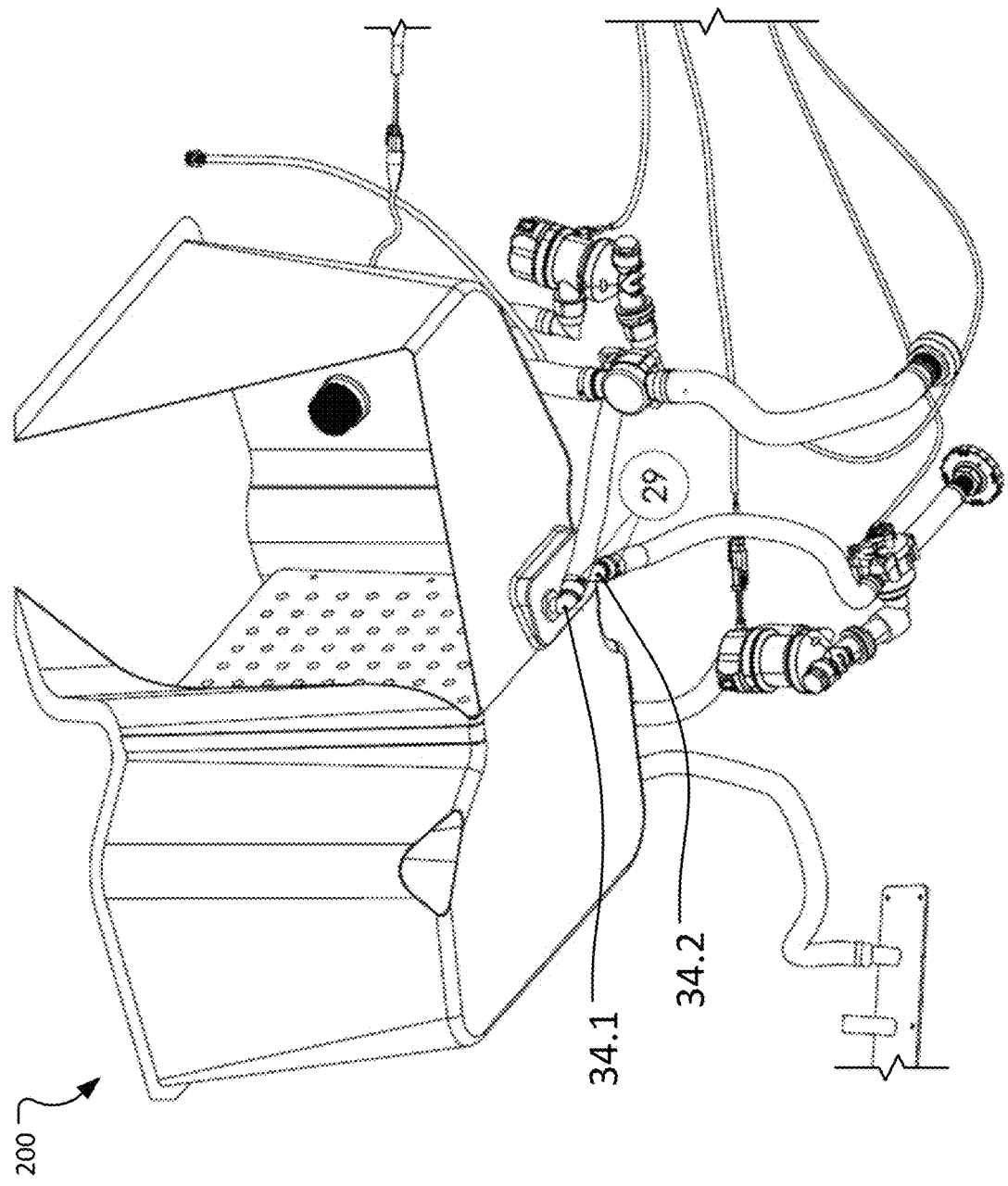

Drain 32.1 (of a set of drains 32) is fluidly connected to fitting 34.1 (of a set of fittings 34) on the underside of the reservoir tank 1 (best seen in FIG. 5B). Drain 32.1 and fitting 34.1 are fluidly connected to a recirculation pump 10.2 (of a set of pumps 10) that is configured to recirculate and aerate water in the reservoir tank 1. In particular, the recirculation pump 10.2 is configured to pump water from the reservoir tank 1, through a tubing loop 28.1 on exhaust side of recirculation pump 10.2 to a T-fitting 5 (e.g., ¾" or any other suitable size) where the water is split in two directions. Water then flows to a pair of underwater venturi fittings 2 on each side of the reservoir tank 1. The underwater venturi fittings 2 aerate the water by drawing in ambient air from above the deck of the fishing boat 100 through fittings 2.1, 2.2. The aerated water flows back into the reservoir tank 1 and the water is recirculated.

The recirculation pump 10.2 is electrically connected to a recirculate switch 26 that turns the recirculation functionality of the livewell system 200 on and off. When the recirculate switch 26 is toggled into the "on" position, power is provided to the recirculation pump 10.2 and water is recirculated in the reservoir tank 1. When the switch 26 is toggled into the "off" position, the recirculation pump 10.2 is stopped so recirculation of the water in the reservoir tank 1, using the recirculation pump 10.2, does not occur. However, it is possible to use the water supply pump 10.1 in a recirculation mode that will be described later in this specification.

A timer 17 is electrically connected to the recirculate switch 26 and the recirculation pump 10.2 to allow pulsed recirculation. For example, the timer can be configured to allow the recirculation pump 10.2 to recirculate the water for 3 minutes, followed by a period where circulation is off for 2 minutes (or any other suitable pattern). This process is then repeated.

Drain 32.2 is fluidly connected to fitting 34.2 on the underside of the reservoir tank 1 (best seen in FIG. 5B). Drain 32.2 and fitting 34.2 are fluidly connected to the three-way valve 8 that was referenced in the previously mentioned filling process. The three-way valve 8 is configured to direct the drain water from the livewell system 200 to either (i) the thru-hull fitting 20 for discharge or (ii) the water supply pump 10.1 for recirculation or forceful discharge. Flow directional control of the three-way valve 8 is controlled using the livewell control knob 24. When the livewell control knob 24 is in the "auto" position, the three-way valve 8 allows water to be pumped in from outside of the fishing boat 100, as previously described. However, drain water from the reservoir tank 1 is also allowed to mix with water entering from the lake. This mixing provides circulation of water in the reservoir tank 1 in addition to the circulation capability described using the circulation pump 10.2. Livewell system 200 provides two independent methods for circulating water in the reservoir tank 1.

The three-wave-valve 8 is configured to mix the intake water and the drain water of the reservoir tank 1. In principle, the mixing works in accordance with a difference in head pressure. The water level in the reservoir tank 1 relative to the water level in the lake where the fishing boat 100 is located causes a difference in head pressure. When the water level in the reservoir tank 1 increases, more head pressure is developed and therefore more water flows through the drain towards the three-way valve 8. This drain water is mixed with inlet water from the lake. In some cases, a full reservoir tank represents about 70% recirculation and 30% water directly from the lake. However, this value varies depending on water level of the reservoir tank 1 relative to the lake, as previously described. Additionally, a backflow preventer located between the intake hose and the three-way valve 8 prevents the reservoir tank 1 from losing water when the livewell control knob is set in the "auto" position.

The draining functionality of the livewell system 200 will now be described with reference to FIGS. 5A and 5B.

Drain 32.2 is fluidly connected to fitting 34.2 on the underside of the reservoir tank 1 (best seen in FIG. 5B). Drain 32.2 and fitting 34.2 are fluidly connected to the three-way valve 8 that was referenced in the previously mentioned filling process. The three-way valve 8 is configured to direct the drain water from the livewell system 200 to either (i) the thru-hull fitting 20 or (ii) the water supply pump 10.1. Flow directional control of the three-way valve 8 is controlled using the livewell control knob 24. By rotating the livewell control knob 24 into the "empty" position, water will drain from the reservoir tank 1 the thru-hull fitting 20 using gravity (i.e., naturally). In this case, fill switch 25 is toggled into the "off" position so that the water supply pump 10.1 stops the flow of water into the reservoir tank 1.

A gravity drain mode is typically used when the fishing boat 100 is mounted on a trailer for transport. The water flows from the drain 32.2 through the three-way valve 8, and out of the livewell system 200 through the thru-hull fitting 20. However, in some cases, forcefully pumping the water out of the livewell system 200 can be preferable to gravity draining. Typically, the fishing boat 100 returns to the dock with fish in the livewell system 200 and the fish need to be removed from the reservoir tank 1. However, the fish will be swimming around in the water and are hard to grab. To resolve this issue, the reservoir tank 1 is drained, but using the gravity drain can take a long time to drain the reservoir tank 1 to levels where it is easy to grab the fish. Pumping water out of the reservoir tank 1 is usually faster than gravity draining. With less water in the reservoir tank 1 it is easier to grab fish in the tank 1 by hand.

By rotating the livewell control knob 24 into the "recirculate" position, water will flow from the drain 34.2 of the reservoir tank 1, through the one-way valve 8, towards the water supply pump 10.1, to the spray head 4. In this case, fill switch 25 is toggled into the "on" position so that the water supply pump 10.1 pumps water. The drain water is pumped to the spray head 4 and back into the reservoir tank 1. Hence, the livewell water is recirculated.

However, by manually toggling the spray head 4 from a mode for spraying water into the reservoir tank 1 to a mode for ejecting water from the livewell system 200, as previously described, the drain water is not recirculated back into the reservoir tank 1. Instead, the drain water is redirected from the spray head 4 to the opening 27.1 of the bilge plate 27 and forcefully ejected from the livewell system 200.

The switches 25, 26 and the control knobs 23, 24 are preferably located on the dash of the fishing boat 100. In some boats, the switches 25, 26 and control knobs 23, 24 are located at the driver's right hand on the helm seat. In some boats, the switches 25, 26 and control knobs 23, 24 are located behind the driver's seat to utilize the available design space of the boat.

The fill switch 25 of the livewell system 200 controls the power to the water supply pump 10.1 so that the water supply pump 10.1 is either on or off. The fluid level control unit 16 overrides the control command from the fill switch 25 to the water supply pump 10.1 when the water level of the reservoir tank 1 has reached the full capacity of the reservoir tank 1.

The recirculate switch 26 of the livewell system 200 controls the power to the recirculation pump 10.2 so that the recirculation pump 10.2 is either on or off. The timer 17 overrides the control command from the recirculate switch 26 to the recirculation pump 10.2 so that the power can be pulsed as previously described.

The volume control knob 23 of the livewell system 200 is used as a control device that effects the water level in the reservoir tank 1. The volume control knob 23 mechanically communicates with the overflow valve 7 to switch the livewell system 200 between a first state of partially filling and maintaining the partially-filled water level and a second state of completely filling and maintaining the full water level. The partially full state is defined by the vertical elevation of the overflow drain 33. The full state is defined by the vertical elevation of the water level sensor 14.

While the vertical elevation of the overflow drain 33 is shown to represent about 75% water capacity of the reservoir tank 1, some livewell systems can have overflow drains positioned for other partially full water levels. For example, some livewell systems include overflow drains that are vertically located to provide and maintain a 25% partially full reservoir tank 1. Some livewell systems include overflow drains that are vertically located to provide and maintain a 50% partially full reservoir tank 1, or any other partially full level.

While the volume control knob 23 mechanically controls the overflow valve 7, some livewell systems include volume control knobs that electrically, pneumatically, or hydraulically control overflow valves.

The livewell control knob 24 of the livewell system 200 controls the recirculation, filling, and emptying of the reservoir tank 1. The livewell control knob 24 mechanically communicates with the three-way valve 8 to switch the livewell system 200 among a first state of recirculating the water within the reservoir tank 1, a second state of emptying the reservoir tank 1, and a third state of filling the reservoir tank 1.

While the livewell control knob 24 mechanically controls the three-wave-valve 8, some livewell systems include livewell control knobs that electrically, pneumatically, or hydraulically control three-way valves.

Some livewell systems only have livewell control knob 24. In this case, there is no possibility to adjust the volume of water in the reservoir tank 1. In contrast, Livewell system 200 includes the livewell control knob 24 so that water level can be adjusted and maintained during operation of the fishing boat 100.

The livewell system 200 has the ability to flood the reservoir tank 1 and maintain the flooded volume. The overflow valve 7 either allows water to discharge from the system to maintain a partial water level in the tank, or prevents water from discharging from the reservoir tank 1, therefore allowing the water level to increase. The one-way valve 6 prevents water from back-flowing through the system and therefore being discharged from the livewell system 200. The water level sensor 14 and the fluid level control unit 16 electrically communicate with the water supply pump 10.1 to allow the livewell system 200 to maintain either a partial or a full water level.

The various operation modes of the livewell system 200 will now be described with reference to FIGS. 6A-9B.

FIGS. 6A and 6B illustrate a typical partial water level mode for the livewell system 200. With reference to FIG. 6B, the volume control knob 23 is set to "normal" volume and the livewell control knob 24 is set to "auto." The fill switch 25 is toggled into the "on" position, enabling the water supply pump 10.1 to start flowing. The recirculate switch 26 may also be toggled on, but this functionality is not illustrated in detail in FIGS. 6A and 6B.

The water supply pump 10.1 immediately starts pumping water from the lake (represented in the direction of the arrow 252) into the livewell system 200. The water supply pump forces inflow from the lake through the three-way valve 8 and directs the water to the spray head 4 and into the reservoir tank 1. When the water level 250 reaches the vertical elevation of the overflow drain 33, the water begins to gravity drain through overflow drain 33, through the overflow valve 7, and is discharged back into the lake (e.g., as represented by arrow 253). The fluid flow path is illustrated using arrows, beginning with intake arrow 252 to the discharge arrow 253.

The fishing boat 100 may rock and the water level 250 may not remain steady. In some cases, the water level can temporarily drop because too much water is discharged by the overflow drain 33 due to sloshing in the reservoir tank 1. However, in these cases, the water supply pump 10.1 will continue to run to replenish the water so that the water level 250 is maintained.

FIG. 6A also illustrates the circulation functionality of the water supply pump 10.1 in conjunction with the livewell control knob being in the "auto" position. In this case, water flows through the drain of the reservoir tank 1 and mixes with water coming from the lake in the three-way valve 8. The water is pumped through the water supply pump 10.1 and flows back into the reservoir tank 1 by the spray head 4.

FIGS. 7A and 7B illustrate a typical recirculation livewell mode for the livewell system 200. With reference to FIG. 7B, the volume control knob 23 is set to "normal" volume and the livewell control knob 24 is set to "recirculate." The fill switch 25 is toggled into the "on" position, enabling the water supply pump 10.1 to start flowing. The recirculate switch 26 may also be toggled on, but this functionality is not illustrated in detail in FIGS. 7A and 7B. Note that the recirculate switch 26 controls the circulation pump 10.2.

The water supply pump 10.1 immediately starts drawing water from the drain of the reservoir tank 1 and pumping in back into the reservoir tank 1 through the spray head. This recirculation is represented by a series of arrows. Water from the lake does not enter the system in this mode.

However, any water that sloshes into the overflow drain 33 is discharged from the livewell system 200. Therefore, it is possible to have a decreasing water level 250 over time when the livewell system 200 is operated in this recirculation mode.

FIGS. 8A and 8B illustrate a typical gravity emptying functionality for the livewell system 200. With reference to FIG. 8B, the volume control knob 23 is set to "normal" volume and the livewell control knob 24 is set to "empty." The fill switch 25 is toggled into the "off" position, so that the water supply pump 10.1 is not powered. The recirculate switch 26 may also be toggled on, but this functionality is not illustrated in detail in FIGS. 8A and 8B.

The three-wave-valve 8 opens to allow water to be gravity-drained from the livewell system 200. Water flows through the three-way valve 8 and out into the lake (represented by arrow 256). Notably, the thru-hull fitting 20 provides both water inlet and discharge functionality in the livewell system 200.

In some cases, a forceful ejection of water can be used in addition to the gravity drain. By toggling on the fill switch 25, the water supply pump 10.1 will begin to recirculate the water back into the reservoir tank 1 through the spray head 4. However, the water pressure will be very low since most of the water is being discharged from the livewell system 200 in the direction of the arrow 256. Preferably, one would rotate the livewell control knob to "recirculate" in addition to manually toggling the spray head 4 into a discharge mode, e.g., by pulling the head of the spray head 4 towards the interior of the reservoir tank 1 as previously described. This action will cause the water will be forcefully diverted out of the livewell system 200 through the opening 27.1 and back into the lake.

FIGS. 9A and 9B illustrate a typical full livewell functionality for the livewell system 200. With reference to FIG. 9B, the volume control knob 23 is set to "full" volume and the livewell control knob 24 is set to "auto." The fill switch 25 is toggled into the "on" position, enabling the water supply pump 10.1 to start flowing. The recirculate switch 26 may also be toggled on, but this functionality is not illustrated in detail in FIGS. 9A and 9B.

The water supply pump 10.1 immediately starts drawing water from the drain of the reservoir tank 1 and from the lake (represented by arrow 252) and pumps the water into the reservoir tank 1 through the spray head 4. Because the volume control knob 23 is set to "full," the overflow valve 7 is closed so that no water can be discharged from the reservoir tank 1 through the overflow drain 33.

Another mode of operation is possible by rotating the volume control switch 23 to a rotary position between the "normal" and "full" markers. For example, if the volume switch is half way between the "normal" and "full" markers, then the mechanical linkage controlling the overflow valve 7 is opened approximately halfway. This allows some water to be discharged from the system, but generally not as much as would be if the volume switch was in the "normal" position (which would be fully open). In these cases, the water supply pump 10.1 could add water to the reservoir tank 1 faster than an amount that is discharged through the overflow valve 7. Once the water level reaches the water level sensor 14, the water supply pump 10.1 shuts off, and some water would likely splash out or seep out of the reservoir tank 1 during use. When the water level falls below the water level sensor 14, the water supply pump 10.1 begins to pump fresh water back into the reservoir tank 1. This cycle can continue as time goes on.

This can be advantageous when fishing in hot climates, such as southern Florida, where the air temperature could reach 100-110 degrees Fahrenheit. In these climates, the water temperature is especially warm, so an ability to control how much fresh water versus how much recirculation water is used, in addition to the volume of water in the reservoir tank 1, can be helpful to maintain a cooler livewell water temperature. Cooler water temperature in the livewell is important for preserving the caught fish, because as water temperature decreases, the dissolved oxygen content in the water increases, which is a better environment for preserving the caught fish.

Figure 12A:
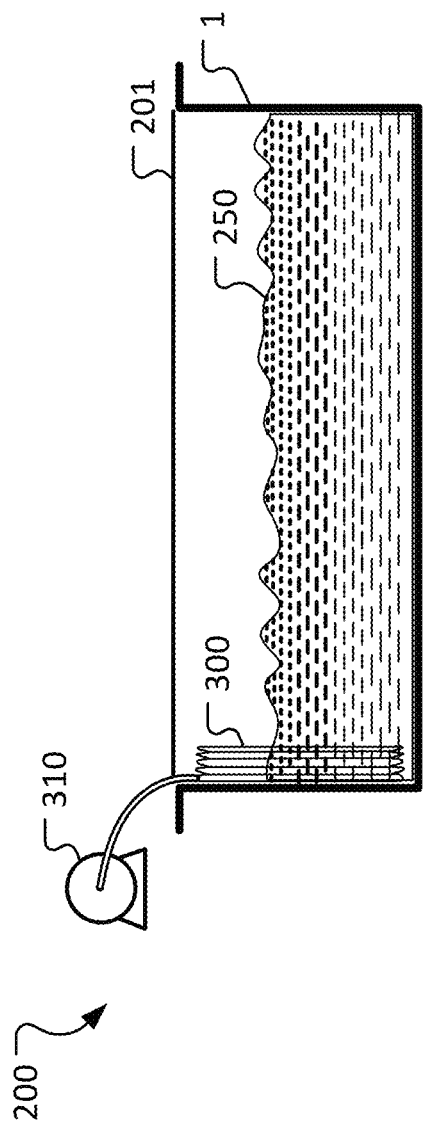
FIG. 12A shows an example livewell system with an inflatable bladder in a deflated state.
Figure 12B:
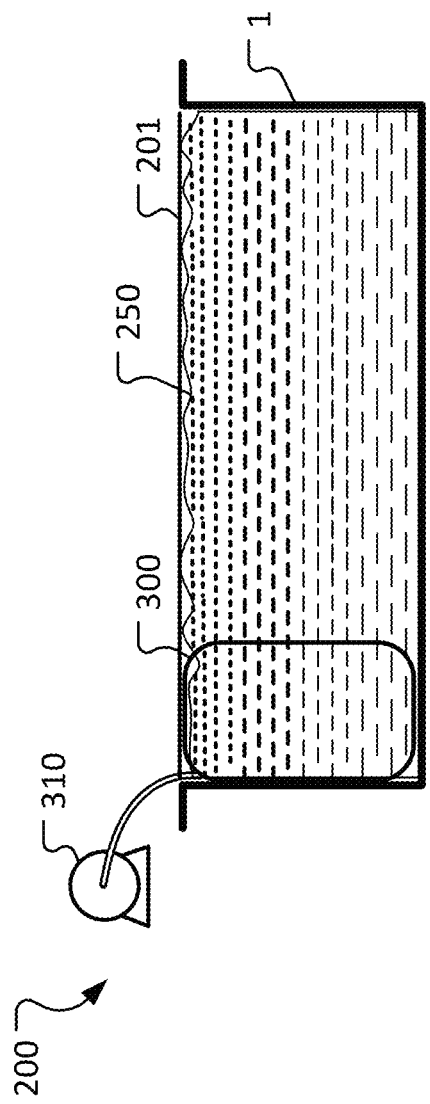
FIG. 12B shows the livewell system of FIG. 12A with the inflatable bladder in an inflated state.

While the above description of the livewell system 200 mitigates the issue of water sloshing by filling the reservoir tank to very close to the top lid, other livewell features/designs for accomplishing a reduction of sloshing are also envisioned. For example, as shown in FIGS. 12A and 12B, in some embodiments an inflatable bladder 300 can be used to increase the water level 250 or to substantially fill the airspace between the top of the water level 250 in the tank 1 and the lid 201 of the tank 1. That is, when there is a need to mitigate sloshing the bladder 300 can be inflated. When the bladder 300 is inflated, it can displace water to make the water level 250 rise and/or can fill much or all of the airspace (the "splash zone") and thereby reduce the potential for water in the tank 1 to slosh around.

In FIGS. 12A and 12B, the livewell system 200 includes an inflatable bladder 300. The inflatable bladder 300 can be located within the tank 1 and can be selectively inflated by receiving air from an air pump 310. The air pump 310 can be operatively activated to inflate and/or deflate the bladder 300 by a user who can flip a switch, push a button, and the like. In some cases, the depicted livewell system 200 that includes the inflatable bladder 300 can additionally have some, none, or all of the features of the livewell systems described above.

In FIG. 12A, the inflatable bladder 300 is shown in a deflated state. The water level 250 is far below the top of the tank 1. Accordingly, a "splash zone" exists above the surface of the water level 250 and the lid 201. In order to reduce the potential for the water to slosh around in the tank 1, the bladder 300 can be inflated as depicted in FIG. 12B.

In FIG. 12B, the inflatable bladder 300 is shown in an inflated state. In response, the water level 250 is raised to essentially the top of the tank 1 as a result of the increased amount of volume within the tank 1 that is taken up by the inflated/enlarged inflatable bladder 300. Said another way, the enlarged bladder 300 displaces water to make the water level 250 rise in the tank 1. Accordingly, it can be envisioned that the inflation of the bladder 300 can be used to mitigate the issue of water sloshing in the tank 1 by displacing water and thereby causing the water level 250 in the reservoir tank 1 to be at or very close to the top lid 201.

In some embodiments, the air pump 310 can also be activated to draw air out of the inflatable bladder 300 (to reduce the volume of the inflatable bladder 300). In such a case, the water level 250 can be reduced from a high level as shown in FIG. 12B to a lower water level 250 as shown in FIG. 12A, for example. Any water level 250 therebetween can be selected by a user in accordance with the extent to which the inflatable bladder 300 is inflated by the user.

While in the depicted embodiment the inflatable bladder 300 is shown as being attached to a sidewall of the tank 1, it should be understood that the inflatable bladder 300 can be positioned at various locations in the tank 1. For example, in some embodiments the inflatable bladder 300 can be positioned on the bottom of the tank 1. In some embodiments, the inflatable bladder 300 can be positioned on other sidewalls of the tank 1. Some embodiments can include two or more inflatable bladders 300. In each of these examples, the inflation of the bladder 300 displaces water in the tank 1 and thereby causes the water level 250 to rise.

In some embodiments, the inflatable bladder 300 can be positioned on bottom surface of the lid 201 of the tank 1. In such a case, the inflatable bladder 300 can be inflated/enlarged to fill the air space between the surface of the water level 250 and the lid 201. This can also serve to mitigate sloshing of the water in the tank 1, by eliminating the "splash zone" between the surface of the water level 250 and the lid 201. In some embodiments, a first inflatable bladder 300 can be located on an interior wall of the tank 1 and a second inflatable bladder 300 can be located on a bottom surface of the lid 201 of the tank 1.

While the livewell systems described above are designed to be able to function in multiple modes of operation, embodiments of single mode livewell systems are also envisioned and are within the scope of this disclosure. For example, some single mode livewell system embodiments according to the present disclosure are designed to operate such that the reservoir is filled, or essentially filled, with water all of the time that the livewell system is in use. Embodiments of this type can include devices for causing the upper surface of the water in the tank to be maintained at an elevation close to the top of the reservoir (to thereby mitigate the potential for water sloshing). For example, some such embodiments include a water level sensor that is positioned close to the top of the reservoir. Such a water level sensor can be any type of suitable sensor (e.g., float switch, ultrasonic sensor, optical sensor, conductivity sensor, and the like). When water is detected by the water level sensor, a signal output from the sensor can be used to cease additional rising of the water level in the reservoir. Additionally, or alternatively, some such embodiments include one or more drain ports positioned close to the top of the reservoir for the same purpose. In some cases, such a water level sensor and/or drain port can be elevation-adjustable relative to the reservoir. That is, while the water level sensor and/or drain port can be positioned close to the top of the reservoir, the water level sensor and/or drain port also can be repositioned to a lower elevation relative to the reservoir. Such reposition can be performed manually, automatically, or semi-automatically. In such a case, the single mode livewell system can be made to operate to control the level of the water at various elevations in the reservoir as desired.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A livewell system for use on a boat, the livewell system comprising:
   a reservoir tank defining a first compartment and a second compartment that are separable by a removable divider located at a mid-section of the reservoir tank;
   a water supply system operable to pump external water into the reservoir tank;
   two drains located on a bottom of the reservoir tank;
   a water drainage system comprising a valve and a first pump, wherein the water drainage system is operable for a user to select between a gravity drain mode and a pump-assisted drain mode, wherein:
      in the gravity drain mode, gravity forces water: (i) out via the bottom of the reservoir tank and into fluid conduit coupled to the bottom of the reservoir tank, (ii) then through the valve that has been opened, and (iii) then out a first discharge port, and
      in the pump-assisted drain mode, activation of the first pump: (i) draws the water out via the bottom of the reservoir tank and into the fluid conduit coupled to the bottom of the reservoir tank, (ii) then passes the water through the first pump, and (iii) then ejects the water out a second discharge port;
   a water recirculation system comprising a second pump operable to withdraw water from the first compartment and return at least some of the water to the second compartment;
   a water level sensor coupled to the reservoir tank and operable to output a high water signal when the reservoir tank becomes full or nearly full of water; and
   a control system arranged to receive the high water signal from the water level sensor and configured to output a signal to restrict further addition of water into the reservoir tank based on receiving the high water signal.

2. The livewell system of claim 1, wherein the signal to restrict further addition of water causes stoppage of the water supply system.

3. The livewell system of claim 1, wherein the mid-section of the reservoir tank has a width that is less than that of the first and second compartments.

4. The livewell system of claim 1, wherein the divider defines multiple openings.

5. The livewell system of claim 1, wherein the water level sensor comprises a float switch.

6. The livewell system of claim 1, further comprising:
   a first lid that is reconfigurable between: (i) a closed position in which the first lid covers a top opening of the first compartment and (ii) an open position in which the top opening of the first compartment is not covered by the first lid; and
   a second lid that is reconfigurable between: (i) a closed position in which the second lid covers a top opening of the second compartment and (ii) an open position in which the top opening of the second compartment is not covered by the second lid.

7. The livewell system of claim 1, further comprising one or more lids being reconfigurable between: (i) a closed position in which the one or more lids cover a top opening of the reservoir tank and (ii) an open position in which the top opening of the reservoir tank is not covered by the one or more lids.

8. The livewell system of claim 7, wherein, while the one or more lids is/are in the closed position and the control system has restricted further addition of the water into the reservoir tank based on receiving the high water signal, an airspace that is less than three inches high exists between the water and the lid.

9. The livewell system of claim 7, wherein, while the one or more lids is/are in the closed position and the control system has restricted further addition of the water into the reservoir tank based on receiving the high water signal, an airspace that is less than two inches high exists between the water and the lid.

10. The livewell system of claim 7, wherein, while the one or more lids is/are in the closed position and the control system has restricted further addition of the water into the reservoir tank based on receiving the high water signal, an airspace that is less than one inch high exists between the water and the lid.

11. The livewell system of claim 1, further comprising a recirculation timer system operable to control the water recirculation system to perform water recirculation for a first time period, then to cease the water recirculation for a second time period, then to repeat the water recirculation for the first time period, and so on in a repetitive manner.

12. The livewell system of claim 1, wherein the control system uses a time delay period to control operations of the water supply system to add water into the reservoir tank.

13. The livewell system of claim 12, wherein the control system comprises a microprocessor.

14. The livewell system of claim 1, wherein the control system comprises a microprocessor.

15. The livewell system of claim 1, wherein the control system uses a time delay period to control operations of the water supply system to add water into the reservoir tank, wherein the water level sensor comprises a float switch, wherein the signal to restrict further addition of water causes stoppage of the water supply system, and wherein the control system comprises a microprocessor.

* * * * *